US012751455B2

(12) United States Patent
Sangle

(10) Patent No.: US 12,751,455 B2
(45) Date of Patent: Oct. 6, 2026

(54) AGROCHEMICAL COMBINATIONS

(71) Applicant: UPL LTD, Mumbai (IN)

(72) Inventor: Prabhakar Sangle, Mumbai (IN)

(73) Assignee: UPL LTD, Mumbai (IN)

( * ) Notice: Subject to any disclaimer, the term of this patent is extended or adjusted under 35 U.S.C. 154(b) by 1113 days.

(21) Appl. No.: 17/626,970

(22) PCT Filed: Jul. 1, 2020

(86) PCT No.: PCT/IB2020/056209
§ 371 (c)(1),
(2) Date: Jan. 13, 2022

(87) PCT Pub. No.: WO2021/014240
PCT Pub. Date: Jan. 28, 2021

(65) Prior Publication Data

US 2022/0322673 A1 Oct. 13, 2022

(30) Foreign Application Priority Data

Jul. 25, 2019 (IN) ............................. 201921030147

(51) Int. Cl.
*A01N 59/00* (2006.01)

(52) U.S. Cl.
CPC .................................... *A01N 59/00* (2013.01)

(58) Field of Classification Search
None
See application file for complete search history.

(56) References Cited

U.S. PATENT DOCUMENTS

| | | | |
|---|---|---|---|
| 7,696,232 B2 | 4/2010 | Berger et al. | |
| 11,517,016 B2 * | 12/2022 | Kumar | A01N 41/10 |
| 2009/0082204 A1 * | 3/2009 | Royalty | A01M 25/006 222/608 |
| 2012/0015047 A1 | 1/2012 | Vanden Berghe | |
| 2013/0183390 A1 * | 7/2013 | Reid | A01N 51/00 514/315 |
| 2014/0148493 A1 | 5/2014 | Tamura et al. | |
| 2017/0071199 A1 | 3/2017 | Baur et al. | |
| 2020/0253207 A1 | 8/2020 | Kumar et al. | |

FOREIGN PATENT DOCUMENTS

| | | | | |
|---|---|---|---|---|
| CN | 1212838 A * | 4/1999 | | |
| CN | 102365970 A | 3/2012 | | |
| CN | 102726410 B | 10/2012 | | |
| CN | 102791128 A | 11/2012 | | |
| CN | 103329924 A | 10/2013 | | |
| CN | 103461333 A | 12/2013 | | |
| CN | 103651466 A | 3/2014 | | |
| CN | 103518769 B | 1/2015 | | |
| JP | H01305003 A | 12/1989 | | |
| JP | 2000169461 A | 6/2000 | | |
| JP | 2011126837 A | 6/2011 | | |
| WO | WO-2012035364 A1 * | 3/2012 | A61K 8/42 | |
| WO | 2019058244 A1 | 3/2019 | | |
| WO | WO-2019150382 A1 * | 8/2019 | C05B 15/00 | |

OTHER PUBLICATIONS

Belton DJ, Deschaume O, Perry CC. An overview of the fundamentals of the chemistry of silica with relevance to biosilicification and technological advances. FEBS J. May 2012;279(10):1710-20. doi: 10.1111/j.1742-4658.2012.08531.x. Epub Apr. 17, 2012. PMID: 22333209; PMCID: PMC3334419. (Year: 2012).*
Translation of Wang et al. CN1212838A, Published Apr. 7, 1998. Machine translation by Espacenet. Retrieved from https://worldwide.espacenet.com/patent/search/family/005220245/publication/CN1212838A?q=CN1212838A (Year: 1998).*
International Search Report and Written Opinion for International Application PCT/IB2020/056209; International Filing Date: Jul. 1, 2020; Date of Mailing: Sep. 8, 2020; 11 pages.
International Search Report and Written Opinion; International Application No. PCT/IB2018/057087; International Filing Date Sep. 15, 2018; Date of Mailing Nov. 13, 2018; 10 pages.

* cited by examiner

*Primary Examiner* — Ali Soroush
*Assistant Examiner* — Afua Bamfoaa Boateng
(74) *Attorney, Agent, or Firm* — CANTOR COLBURN LLP

(57) ABSTRACT

The present invention relates to a novel agricultural pesticidal composition. In particular, the present invention provides a pesticidal composition comprising combination of an insecticide and plant health promoting agent. The said combination is highly suitable for controlling unwanted animal pests, such as insects, acaricides and/or nematodes, and unwanted phytopathogenic fungi.

7 Claims, No Drawings

AGROCHEMICAL COMBINATIONS

CROSS REFERENCE TO RELATED APPLICATIONS

This application is a National Stage application of PCT/IB2020/056209, filed Jul. 1, 2020, which claims the benefit of priority to Indian patent application Ser. No. 20/192, 1030147, filed Jul. 25, 2019, both of which are incorporated by reference in their entirety herein.

FIELD OF INVENTION

The present invention relates to a novel agricultural pesticidal composition. In particular, the present invention provides a pesticidal composition comprising combination of an insecticide and plant health promoting agent. The said combination is highly suitable for controlling unwanted animal pests, such as insects, acaricides and/or nematodes, and unwanted phytopathogenic fungi.

BACKGROUND OF THE INVENTION

An insecticide is a substance used to kill insects. They include ovicides and larvicides used against insect eggs and larvae, respectively.

Generally selective feeding blockers (or inhibitors) are a group of insecticides that have a broad or physical mode of action that prevents insects from feeding by interfering with neural regulation of plant fluid intake in the mouthparts. Selective feeding blockers are active on certain phloem-feeding insects that are problematic in greenhouse production systems; these include aphids and whiteflies.

Flonicamid (N-cyanomethyl-4-trifluoromethylnicotinamide), a pyridine carboxamide compound, is a systemic insecticide with selective activity against hemipterous pests, such as aphids and whiteflies, and thysanopterous pests. Flonicamid is very active against aphids, regardless of differences in species, stages and morphs. Flonicamid is also effective against some other species of sucking insects such as the greenhouse whitefly (*Trialeurodes vaporariorum*), yellow tea thrips (*Scirtothrips dorsalis*), Indian cotton leafhopper (*Amrasca biguttula*), tea green leafhopper (*Empoasca onukii*), tarnished plant bug (*Lygus lineolaris*), potato psyllid (*Bactericera cockerelli*) and brown rice planthopper (*Nilaparvata lugens*). It rapidly inhibits the feeding behavior of aphids and provides long-lasting control. Flonicamid shows no cross-resistance a conventional insecticide and exhibits excellent systemic and translaminar activity. It has no negative impact on beneficial insects and mites.

Chlorantraniliprole (CTPR), is an anthranilic diamide insecticide, which specifically targets insect ryanodine receptors (RyRs) that are critical for muscle contraction in insects. CTPR has been widely evaluated for management of turfgrass pests, especially scarab grubs and caterpillars. Chlorantraniliprole is primarily active on chewing pests by ingestion and by contact, showing good ovi-larvicidal and larvicidal activity.

Novaluron, chemically known as (±)-1-[3-chloro-4-(1,1,2-trifluoro-2-trifluoro-methoxyethoxy)phenyl]-3-(2,6-difluorobenzoyl)urea, is a benzoylphenyl urea insecticide that exhibits potent insecticidal activity against several important foliage feeding insect pests. It is a potent suppressor of important lepidopteran and coleopte-ran pests and can provide control of several homopteran and dipteran pests.

Various plant health promoting agents are known in the art including fertilizers, biologicals as well as plant additives that can promote growth as well as improve yield of the plant. The element silica is the second most abundant element in the earths crust. There are various studies that have been conducted that prove the importance of silica in the growth of plants. Studies have also demonstrated that silica is taken up in the same amount as any other known micronutrient (Role of Orthosilicic Acid (OSA) based formulation in Improving Plant Growth and Development, Jain et. al, Silicon (2016)). There are many silica based fertilizers and plant growth promoters known in the art. However, none have been mixed with combination of fungicides and insecticides.

There is therefore a need in the art for combinations of insecticidal compound with plant health promoter that help to improve spectrum as well as promote greater plant health, and improve yield. With crop tolerances decreasing, lower use rates being imposed and resistance being increasingly observed, there is a need for a combination product that allows for broader disease control spectrum and improved plant health that combines curative and preventive actives and has a lower dosage.

Therefore, present invention addresses one or more above solutions and ameliorate one or more of the above-mentioned problems.

Embodiments of the present invention may provide combinations of insecticide and plant health promoter that possess an enhanced efficacy over the individual active compound used in isolation and optionally with at least on fungicides.

The various embodiments of the present invention may, but do not necessarily, achieve one or more of the following advantages and/or objects:

OBJECT OF THE INVENTION

An object of the present invention is to provide a combination of insecticide and plant health promoter that provide effective insect control at locus and causes an enhanced greening of the crops to which it is administered.

Another object of the present invention is to provide said combination that when applied to the locus of a plant results in increased yield of the crop.

Yet another object of the present invention is to provide a combination that results into reduced fungal disease incidence in the crops to which it is applied.

Another object of the present invention is to provide a combination that achieves increased yield in the crops to which it is applied.

Another object of the present invention is to provide a combination that causes an enhanced insecticidal activity.

Another object of the present invention is to provide a combination which enhances the protection to plants from attack or infestation by insects, acarids or nematodes.

Another object of the present invention is to provide a synergist for insecticides.

Some or all these and other objects of the invention are can be achieved by way of the invention described hereinafter.

SUMMARY OF THE INVENTION

According to an aspect of the present invention there is provided a combination comprising: at least one insecticide and at least one plant health promoting agent.

Another aspect of the present invention can provide a synergistic composition comprising: at least one insecticide and at least one plant health promoting agent.

Another aspect of the present invention provides a composition comprising combination of at least one insecticide and at least one plant health promoting agent; and at least one agrochemically acceptable excipient.

Another aspect of the present invention provides a combination comprising: at least one multi-site fungicide; at least one insecticide and at least one plant health promoting agent.

Another aspect of the present invention provides a composition comprising: at least one multi-site fungicide; at least one insecticide and at least one plant health promoting agent optionally at least one agrochemically acceptable excipient.

Another aspect of the present invention provides a combination comprising: at least one dithiocarbamate fungicide; at least one insecticide and at least one plant health promoting agent.

Another aspect of the present invention provides a composition comprising: at least one dithiocarbamate fungicide; at least one insecticide; at least one plant health promoting agent; and at least one agrochemically acceptable excipient.

Yet another aspect of the present invention can provide a combination comprising: at least one multi-site fungicide; at least one insecticide; at least one plant health promoting agent; and at least one agrochemical active.

Yet another aspect of the present invention can provide a composition comprising: at least one multi-site fungicide; at least one insecticide; at least one plant health promoting agent; at least one agrochemical active; and at least one agrochemically acceptable excipient.

In another aspect the present invention provides a composition comprising reduced amount of active ingredient and applying at the locus to be treated for improving activity against insects, mites, nematodes and/or phytopathogens.

In another aspect the present invention provides a composition comprising reduced amount of insectidal compound and applying at the locus to be treated for improving activity against insects, mites, nematodes and/or phytopathogens.

In another aspect, the present invention provides a method to reduce the application rates and broaden the activity the insecticide(s) against insects, mites, nematodes and/or phytopathogens.

In another aspect, the present invention provides a method of controlling fungal and/or insecticidal pests at a locus and promoting health of the plant, said method comprising applying a combination comprising at least one insecticide and at least one plant health promoting agent optionally at least one fungicide.

In another aspect, the present invention provides a method of treating plant from pests comprising applying a combination of at least one insecticide and at least one plant health promoting agent optionally at least one fungicide.

In another aspect, the present invention provides a method for partial or complete preventive and/curative treatment of plant or propagation material thereof using a insecticidal composition comprising at least one insecticide and at least one plant health promoting agent.

In another aspect the present invention provides a method of controlling unwanted pests on plants or propagation material thereof, said method comprising applying an agrochemically effective amount of a combination to the pests or to their locus, comprising at least one insecticide and at least one plant health promoting agent optionally with one or more agrochemically acceptable excipients.

In an aspect the present invention provides use of a composition comprising at least one insecticide and at least one plant health promoting agent.

In another aspect the present invention provides use of said combination of at least one insecticide and at least one plant health promoting agent or composition thereof, for reducing overall damage of plants and plant parts as well as losses in harvested fruits or vegetables caused by insects, mites, nematodes and/or phytopathogens.

In another aspect, the present invention provides use of a combination at locus to be treated against insects, mites, nematodes and/or phytopathogens, comprising applying at locus to be treated a combination of at least one insecticide and at least one plant health agent.

In another aspect, the present invention provides use of a combination to promote health of the plant, comprising applying to a plant to be treated a combination of comprising at least one insecticide and at least one plant health promoting agent.

In another aspect, the present invention provides a kit of parts comprising at least one insecticide, at least one plant health promoting agent optionally with one or more agrochemically acceptable excipients and an instruction information to apply said components at the locus to be treated against pests specifically insects.

DETAILED DESCRIPTION OF THE INVENTION

For the purposes of the following detailed description, it is to be understood that the invention may assume various alternative variations except where expressly specified to the contrary. Moreover, other than in any operating examples, or where otherwise indicated, all numbers expressing, for example, quantities of materials/ingredients used in the specification are to be understood as being modified in all instances by the term “about”.

The term “about” used to qualify the amounts of mancozeb and carbendazim shall be interpreted to mean “approximately” or “reasonably close to” and any statistically insignificant variations therefrom.

As used herein, the terms “comprising” “including,” “having,” “containing,” “involving,” and the like are to be understood to be open-ended, i.e., to mean including but not limited to. The terms “preferred” and “preferably” refer to embodiments of the invention that may afford certain benefits, under certain circumstances.

In any aspect or embodiment described hereinbelow, the phrase comprising may be replaced by the phrases “consisting of” or “consisting essentially of” or “consisting substantially of”. In these aspects or embodiment, the combination or composition described includes or comprises or consists of or consists essentially of or consists substantially of the specific components recited therein, to the exclusion of other fungicides or insecticide or plant growth promoting agents or adjuvants or excipients not specifically recited therein.

The term “agriculturally acceptable amount of active” refers to an amount of an active that kills the pest or inhibits the plant disease for which control is desired, in an amount not significantly toxic to the plant being treated.

The term “synergistically effective amount” according to the present invention represents a quantity of a combination of an insecticide and plant growth promoting agent and/or fungicide that is statistically significantly more effective against insects, mites, nematodes and/or phytopathogens than the individual active.

The term ‘reduced amount of insecticide compound” used herein means reducing about 10% or 15% or 20% or 25% or 30% and so on, of recommended dose of insecticide compound.

The terms "active against a pest", refer herein means direct or indirect effects include inducing death of the pest, repelling the pest from any part of the plant, including but not limited to seeds, roots, shoots and/or foliage, inhibiting feeding of the pest on, or the laying of its eggs on, the plant seeds, roots, shoots and/or foliage, and inhibiting or preventing reproduction of the pest.

As used herein, the terms "pesticidal effect" and "pesticidal activity" mean any direct or indirect action on the target pest that results in reduced feeding damage on any part of the plant, including but not limited to the seeds, roots, shoots and foliage of plants as compared to untreated plants. The term "insecticidal activity" has the same meaning as pesticidal activity, except it is limited to those instances where the pest is an insect The term 'disease control' as used herein denotes control and prevention of a disease.

Controlling effects include all deviation from natural development, for example: killing, retardation, decrease of the fugal disease.

The term 'plants' refers to all physical parts of a plant, including seeds, seedlings, saplings, roots, tubers, stems, stalks, foliage and fruits. The term plant includes transgenic and non-transgenic plants.

The term "locus" of a plant as used herein is intended to embrace the place on which the plants are growing, where the plant propagation materials of the plants are sown or where the plant propagation materials of the plants will be placed into the soil. The term "plant propagation material" is understood to denote generative parts of a plant, such as seeds, vegetative material such as cuttings or tubers, roots, fruits, tubers, bulbs, rhizomes and parts of plants, germinated plants and young plants which are to be transplanted after germination or after emergence from the soil. These young plants may be protected before transplantation by a total or partial treatment by immersion.

The term "Plant pest" means any organism known to associate with plants and which, as a result of that association, causes a detrimental effect on the plant's health and vigor. Plant pests include but are not limited to fungi, bacteria, viruses, molds, insects, mites nematodes and acaricide or any other organism that causes a detrimental effect on the plant's health or vigor, excluding mammals, fish and birds. The term "Insecticides" as well as the term "insecticidal" refers to the ability of a substance to increase mortality or inhibit growth rate of insects. As used herein, the term "insects" includes all organisms in the class "Insecta". The term "pre-adult" insects refer to any form of an organism prior to the adult stage, including, for example, eggs, larvae, and nymphs.

The term "Nematicides" and "nematicidal" refers to the ability of a substance to increase mortality or inhibit the growth rate of nematodes. In general, the term "nematode" comprises eggs, larvae, juvenile and mature forms of said organism.

The term "Acaricide" and "acaricidal" refers to the ability of a substance to increase mortality or inhibit growth rate of ectoparasites belonging to the class Arachnida, sub-class Acari. Typically, the insecticides mentioned herein are well known can be searched and found in the internet link, http://www.alanwood.net/pesticides.

The term "plant health promoter" or "plant health promoting agent" are used synomysouly in the description.

Surprisingly, the insecticidal and/or acaricidal and/or antimicrobial activity or the fungicidal activity and/or the plant-invigorating activity and/or the yield-enhancing activity of the active compound combinations according to the invention was found to be significantly higher than the sum of the activities of the individual active compounds.

It has surprisingly been found that the addition of a plant health promoting additive to an insecticide synergistically enhances the efficacy of the insecticide against pests. Therefore, the insecticidal activity of the insecticide in the presence of a plant health promoting agent of the present invention was surprisingly higher than in the absence of the plant health promoting agent.

The compositions of the present invention further comprise a fungicide.

Accordingly the present invention provides a combination of an insecticide, fungicide and plant health promoting agent.

Typically, the fungicide is selected from the group comprising multi-site fungicide and systemic fungicide.

It has further been surprisingly been found that the addition of a plant health promoting additive to a combination of fungicide preferably a multi-site fungicide, preferably a dithiocarbamate fungicide, and an insecticide compounds resulted in surprising and unexpected advantages. It was surprising that the addition of a plant health promoter such as a silicic acid based additive when combined with a multi-site fungicide and an insecticide, preferably a combination of an insecticide and a plant health promoter, resulted in an enhancement of the efficacy. Additionally a surprising reduction in fungal disease incidence and enhanced pest control in comparison to the efficacy seen only with the combination of insecticide(s) with at least another fungicide. It has further been found that the addition of a plant health promoting additive to a combination of a multisite fungicide and an insecticide led to better greening in the crop as well as greater yield from the crop to which they were applied.

These surprising advantages of the combinations of the invention were not observed when the multisite fungicide, preferably the dithiocarbamate fungicide, was not present in the combination or when the health promoting additive was not added to the combination. Therefore, these unexpected advantages of the combination of the present invention could be attributed to the inclusion of a plant health promoting additive, or to a combination of a dithiocarbamate fungicide, and an insecticide with the plant health promoting additive.

Thus, in an aspect, the present invention provides a combination comprising:

(a) at least one insecticide; and (b) at least a silicic acid based plant health promoting agent.

In another aspect, the present combination further comprising a fungicide.

In another aspect, the present invention provides a combination comprising:

(a) at least one insecticide;

(b) at least one multisite fungicide; and (c) at least a silicic acid based plant health promoting additive.

In an embodiment, the plant health promoting additive according to the present invention is a silicic acid based additive selected from those having the general formula:

$$[SiO_x(OH)_{4-2x}]_n$$

In an embodiment silicic acids is selected from metasilicic acid ($H_2SiO_3$), orthosilicic acid ($H_4SiO_4$), disilicic acid ($H_2Si_2O_5$), and pyrosilicic acid ($H_6Si_2O_7$); preferably orthosilicic acid, more specifically stabilised orthosilicic acid.

In a preferred embodiment, the plant health promoting additive is ortho-silicic acid.

In an embodiment, the combination of the present invention comprises at least one insecticide selected from the group comprising arsenical insecticides, botanical insecticides, carbamate insecticides, benzofuranyl methylcarbamate insecticides, dimethylcarbamate insecticides, oxime carbamate insecticides, phenyl methylcarbamate insecticides, dinitrophenol insecticides, fluorine insecticides, formamidine insecticides, fumigant insecticides, inorganic insecticides, insect growth regulators, benzoylphenylurea chitin synthesis inhibitors, macrocyclic lactone insecticides, neonicotinoid insecticides, nereistoxin analogue insecticides, organochlorine insecticides, organophosphorus insecticides, organothiophosphate insecticides, heterocyclic organothiophosphate insecticides, phenyl organothiophosphate insecticides, phosphonate insecticides, phosphonothioate insecticides, phosphoramidate insecticides, phosphoramidothioate insecticides, phosphorodiamide insecticides, oxadiazine insecticides, oxadiazolone insecticides, phthalimide insecticides, physical insecticides, pyrazole insecticides, pyrethroid insecticides, pyrethroid ether insecticides, pyrimidinamine insecticides, pyrrole insecticides, quaternary ammonium insecticides, sulfoximine insecticides, tetramic acid insecticides, tetronic acid insecticides, phenylpyrazole insecticides, thiazole insecticides, thiazolidine insecticides, thiourea insecticide or combinations thereof.

In preferred embodiment, the insecticide is selected from the group comprising diamide or pyridylpyrazole insecticides, pyrrole insecticides, moulting hormone agonists, benzoylphenylurea chitin synthesis inhibitors, pyridylmethylamine neonicotinoid insecticides, aliphatic amide organothiophosphate insecticides, hosphoramidothioate insecticides, quinoxaline organothiophosphate insecticides, phenylpyrazole insecticides, aliphatic amide organothiophosphate insecticides, phosphoramidothioate insecticides, organophosphate insecticides, neonicotinoid insecticides, macrocyclic lactone insecticides, pyrethroid ester insecticides or combinations thereof.

In an embodiment the combination of the present invention comprises at least one insecticide selected from the group comprising uncouplers of oxidative phosphorylation via disruption of the proton gradient may be selected from Chlorfenapyr, DNOC, Sulfluramid and mixtures thereof, Ecdysone receptor agonists, Nicotinic acetylcholine receptor (nAChR) channel blockers, Inhibitors of chitin biosynthesis, Chordotonal organ Modulators and nicotinic acetylcholine receptor (nAChR) competitive modulators or combinations thereof.

In an embodiment, Uncouplers of oxidative phosphorylation via disruption of the proton gradient may be selected from Chlorfenapyr, DNOC, Sulfluramid and mixtures thereof.

In an embodiment, Ecdysone receptor agonists may be selected from Chromafenozide, Halofenozide, Methoxyfenozide, Tebufenozide and mixtures thereof.

In an embodiment. Nicotinic acetylcholine receptor (nAChR) channel blockers may be selected from Bensultap, Cartap hydrochloride, Thiocyclam, Thiosultap-sodium and mixtures thereof.

In an embodiment, Inhibitors of chitin biosynthesis may be selected from Bistrifluron, Chlorfluazuron, Diflubenzuron, Flucycloxuron, Flufenoxuron, Hexaflumuron, Lufenuron, Novaluron, Noviflumuron, Teflubenzuron, Triflumuron, Buprofezin and mixtures thereof.

The preferred Inhibitors of chitin biosynthesis may be Novaluron, Chlorfluazuron, Lufenuron, Buprofezin.

In an embodiment, Chordotonal organ Modulators—undefined target site may be selected from Flonicamid and the like.

In an embodiment, the nicotinic acetylcholine receptor (nAChR) competitive modulators may be selected from Neonicotinoids such as Acetamiprid, Clothianidin, Dinotefuran, Imidacloprid, Nitenpyram, Thiacloprid, Thiamethoxam; Sulfoximines such as sulfoxaflor; Butenolides such as Flupyradifurone; Mesoionics such as Triflumezopyrim and mixtures thereof.

The preferred nicotinic acetylcholine receptor (nAChR) competitive modulators may be Acetamiprid, Clothianidin, Imidacloprid, Thiacloprid, Thiamethoxam, sulfoxaflor.

In a preferred embodiment the insecticide can be selected from selective feeding blockers (or inhibitors) group.

In a preferred embodiment, the insecticide is selected from acephate, dimethoate, Methamidophos, Phosphamidon, Quinalphos, flonicamed, emamectin, lambda cyhalothrin, chlorfenapyr, Methoxyfenozide, thiocyclam, novaluron, fipronil, imidacloprid and acetamiprid.

In one preferred embodiment, the insecticide is flonicamid.

In an embodiment, the combination of the present invention further comprises at least a second fungicide or insecticide apart from the multisite fungicide.

In an embodiment, the second insecticide is a combination of at least two more insecticide. In this embodiment, these insecticides are referred to herein as the second and the third insecticide respectively. However, the second and the third insecticide are not the same insecticides, although they can be a combination of two insecticides from the same class of insecticides.

In an embodiment, the combination of the present invention comprises two insecticides selected from above groups and silicic acid based plant health promoting agent.

In an embodiment, the combination of the present invention comprises at least one insecticide selected from above groups (A); a fungicide (C) and silicic acid based plant health promoting agent (B).

In an embodiment the combination of the present invention further comprises a fungicide.

Preferably the combination of the present invention comprises multisite contact fungicide.

In an embodiment, the second and/or third fungicide in the combinations of the present invention may be individually selected from Acetylcholinesterase (AChE) inhibitors, GABA-gated chloride channel blockers, Sodium channel modulators, Nicotinic acetylcholine receptor (nAChR) competitive modulators, Nicotinic acetylcholine receptor (nAChR) allosteric modulators, Glutamate-gated chloride channel (GluCl) allosteric modulators, Juvenile hormone mimics, Chordotonal organ TRPV channel modulators, Mite growth inhibitors, Microbial disruptors of insect midgut membranes, Inhibitors of mitochondrial ATP synthase, Uncouplers of oxidative phosphorylation via disruption of the proton gradient, Nicotinic acetylcholine receptor (nAChR) channel blockers, Inhibitors of chitin biosynthesis, Moulting disruptors, Ecdysone receptor agonists, Octopamine receptor agonists, Mitochondrial complex electron transport inhibitors, Voltage-dependent sodium channel blockers, Inhibitors of acetyl CoA carboxylase, Chordotonal organ Modulators, multi-site miscellaneous insecticides, bioinsecticides and mixtures thereof.

Thus in an embodiment, the fungicide, Acetylcholinesterase (AChE) inhibitors (C) may be selected from the group consisting of carbamates such as Alanycarb (C1), Aldicarb (C2), Bendiocarb (C3), Benfuracarb (C4), Butocarboxim (C5), Butoxycarboxim (C6), Carbaryl (C7), Carbofuran (C8), Carbosulfan (C9), Ethiofencarb (C9), Fenobucarb (C10), Formetanate (C11), Furathiocarb (C12), Isoprocarb (C13), Methiocarb (C14), Methomyl (C15), Metolcarb (C16), Oxamyl (C17) Pirimicarb (C18), Propoxur (C19), Thiodicarb (C20), Thiofanox (C21), Triazamate (C22), Trimethacarb (C23), XMC (C24), Xylylcarb Organophosphates such as Acephate (C25), Azamethiphos (C26), Azinphos-ethyl (C27), Azinphos-methyl (C28), Cadusafos (C29), Chlorethoxyfos (C30), Chlorfenvinphos (C31), Chlormephos (C32), Chlorpyrifos (C33), Chlorpyrifos-methyl (C34), Coumaphos (C35), Cyanophos (C36), Demeton-S-methyl (C37), Diazinon (C38), Dichlorvos/DDVP (C39), Dicrotophos (C40), Dimethoate (C41), Dimethylvinphos (C42), Disulfoton (C43), EPN (C44), Ethion (C45), Ethoprophos (C46), Famphur (C47), Fenamiphos (C48), Fenitrothion (C49), Fenthion (C50), Fosthiazate (C51), Heptenophos (C52), Imicyafos (C53), Isofenphos (C54), Isopropyl O-(methoxyaminothio-phosphoryl) salicylate (C55), Isoxathion (C56), Malathion (C57), Mecarbam (C58), Methamidophos (C59), Methidathion (C60), Mevinphos (C61), Monocrotophos (C62), Naled (C63), Omethoate (C64), Oxydemeton-methyl (C65), Parathion (C66), Parathion-methyl (C67), Phenthoate (C68), Phorate (C69), Phosalone (C70), Phosmet (C71), Phosphamidon (C72), Phoxim (C73), Pirimiphos-methyl (C74), Profenofos (C75), Propetamphos (C76), Prothiofos (C77), Pyraclofos (C78), Pyridaphenthion (C79), Quinalphos (C80), Sulfotep (C81), Tebupirimfos (C82), Temephos (C83), Terbufos (C84), Tetrachlorvinphos (C85), Thiometon (C86), Triazophos (C87), Trichlorfon (C87), Vamidothion (C88) and mixtures thereof.

In an embodiment, the preferred Acetylcholinesterase (AChE) inhibitors may be selected from thiodicarb (C20), methomyl (C15), acephate (C25), and quinalphos (C80).

In another embodiment, the GABA-gated chloride channel blockers may be selected from Chlordane (C89), Endosulfan (C90), Ethiprole (C91), Fipronil (C92) and mixtures thereof.

The preferred GABA gated chloride channel blocker may be fipronil (C92).

In an embodiment, the Sodium channel modulators may be selected from Pyrethroids such as acrinathrin (C93), allethrin (C94), bioallethrin (C95), esdépalléthrine (C96), barthrin (C97), bifenthrin (C98), kappa-bifenthrin (C99), bioethanomethrin (C100), brofenvalerate (C101), brofluthrinate (C102), bromethrin (C103), butethrin (C104), chlorempenthrin (C105), cyclethrin (C106), cycloprothrin (C107), cyfluthrin (C108), beta-cyfluthrin (C109), cyhalothrin (C110), gamma-cyhalothrin (C111), lambda-cyhalothrin (C112), cypermethrin (C113), alpha-cypermethrin (C114), beta-cypermethrin (C115), theta-cypermethrin (C116), zeta-cypermethrin (C116), cyphenothrin (C117), deltamethrin (C118), dimefluthrin (C119), dimethrin (C120), empenthrin (C121), d-fanshiluquebingjuzhi (C122), chloroprallethrin (123), fenfluthrin (C124), fenpirithrin (C125), fenpropathrin (C126), fenvalerate (C127), esfenvalerate (C128), flucythrinate (C129), fluvalinate (C129), tau-fluvalinate (C130), furamethrin (C131), furethrin (C132), heptafluthrin (C133), imiprothrin (C134), japothrins (C135), kadethrin (136), methothrin (C137), metofluthrin (C138), epsilon-metofluthrin (C139), momfluorothrin (C140), epsilon-momfluorothrin (C141), pentmethrin (C142), permethrin (C143), biopermethrin (C144), transpermethrin (C145), phenothrin (C146), prallethrin (C147), profluthrin (C148), proparthrin (C149), pyresmethrin (C150), renofluthrin (151), meperfluthrin (C152), resmethrin (C153), bioresmethrin (C154), cismethrin (C155), tefluthrin (C156), kappa-tefluthrin (C157), terallethrin (C158), tetramethrin (C159), tetramethylfluthrin (C160), tralocythrin (C161), tralomethrin (C162), transfluthrin (C163), valerate (C164), etofenprox (C165), flufenprox (C166), halfenprox (C167), protrifenbute (C168), silafluofen (C169), sulfoxime ((RS)-[11-(4-chlorophenyl)-2-(methylthio)-1-propanone] (EZ)-O-(3-phenoxybenzyl)oxime) (C170), thiofluoximate (C171) or DDT (C172), Methoxychlor (C173), natural pyrethrins such as cinerin-I (C174), cinerin-II (C175), jasmolin-I (C176), jasmolin-II (C177), pyrethrin-I (C178) and pyrethrin-II (C179) or mixtures thereof.

The preferred Sodium channel modulator may be bifenthrin (C98), kappa-bifenthrin (C99), gamma-cyhalothrin (C111), lambda-cyhalothrin (C112), cypermethrin (C113), alpha-cypermethrin (C114), beta-cypermethrin (C115), theta-cypermethrin (C116), zeta-cypermethrin (C116), fenpropathrin (C126), permethrin (C143) and mixtures thereof.

In an embodiment, the nicotinic acetylcholine receptor (nAChR) competitive modulators may be selected from Neonicotinoids such as Acetamiprid (C180), Clothianidin (C181), Dinotefuran (C182), Imidacloprid (C183), Nitenpyram (C184), Thiacloprid (C185), Thiamethoxam (C186); Sulfoximines such as sulfoxaflor (185); Butenolides such as Flupyradifurone (C186); Mesoionics such as Triflumezopyrim (C186) and mixtures thereof.

The preferred nicotinic acetylcholine receptor (nAChR) competitive modulators may be Acetamiprid (C180), Clothianidin (C181), Imidacloprid (C183), Thiacloprid (C185), Thiamethoxam (C186), sulfoxaflor (185).

In an embodiment, the Nicotinic acetylcholine receptor (nAChR) allosteric modulators may be selected from Spinosyns such as Spinetoram (C187), Spinosad (C188) and mixtures thereof.

The preferred Nicotinic acetylcholine receptor (nAChR) allosteric modulators may be Spinosad (C188).

In an embodiment, the Glutamate gated chloride channel (GluCl) allosteric modulators such as Avermectins selected from Abamecdectin (C189), Emamectin benzoate (C190), Lepimectin (C191) and Milbemycins such as Milbemectin (C192), milbemycin A3 (C193), Milbemycin A4 (C194), Mildiomycin (C195) and mixtures thereof.

The preferred Glutamate gated chloride channel (GluCl) allosteric modulators may be abamectin (C189).

In an embodiment, the Juvenile hormone mimics may be selected from Hydroprene (C196), Kinoprene (C197), Methoprene (C198), Fenoxycarb (C199), Pyriproxyfen (C200) and mixtures thereof.

The preferred juvenile hormone mimic may be Pyriproxyfen (C200).

In an embodiment, the Miscellaneous nonspecific (multi-site) inhibitor insecticides may be selected from Methyl bromide and the like, Chloropicrin (C201), Cryolite (Sodium aluminum fluoride) (C202), Sulfuryl fluoride (C203), Borax (C204), Boric acid (C205), Disodium octaborate (C206), Sodium borate (C207), Sodium metaborate (C208), Tartar emetic (C209), Dazomet (C210), Metam (C211) and mixtures thereof.

In an embodiment, the Chordotonal organ TRPV channel modulators may be selected from Pymetrozine (C212), Pyrifluquinazon (C213) and mixtures thereof.

In an embodiment, Mite growth inhibitors may be selected from Clofentezine (C214), Diflovidazin (C215), Hexythiazox (C216), Etoxazole (C217) and mixtures thereof.

In an embodiment, Microbial disruptors of insect midgut membranes may be selected from *Bacillus thuringiensis* subsp. *israelensis* (C218), *Bacillus thuringiensis* subsp. *aizawai* (C219), *Bacillus thuringiensis* subsp. *kurstaki* (C219), *Bacillus thuringiensis* subsp. *tenebrionis* (C220), B.t. crop proteins such as Cry1Ab (C221), Cry1Ac (C222), Cry1Fa (C223), Cry1A.105 (224), Cry2Ab (C225), Vip3A (C226), mCry3A (C227), Cry3Ab (C228), Cry3Bb (C229), Cry34Abl/Cry35Abl (C230), *Bacillus sphaericus* (C231) and the like.

In an embodiment, Inhibitors of mitochondrial ATP synthase may be selected from Diafenthiuron (C232), Azocyclotin (C233), Cyhexatin (C234), Fenbutatin oxide (C235), Propargite (236), Tetradifon (C237) and mixtures thereof.

In an embodiment, Uncouplers of oxidative phosphorylation via disruption of the proton gradient may be selected from Chlorfenapyr (C238), DNOC (C239), Sulfluramid (C240) and mixtures thereof.

In an embodiment. Nicotinic acetylcholine receptor (nAChR) channel blockers may be selected from Bensultap (C241), Cartap hydrochloride (C242), Thiocyclam (C243), Thiosultap-sodium (C244) and mixtures thereof.

In an embodiment, Inhibitors of chitin biosynthesis may be selected from Bistrifluron (C245), Chlorfluazuron (C246), Diflubenzuron (C247), Flucycloxuron (C248), Flufenoxuron (C249), Hexaflumuron (C250), Lufenuron (C251), Novaluron (C252), Noviflumuron (C253), Teflubenzuron (C254), Triflumuron (C255), Buprofezin (C256) and mixtures thereof.

The preferred Inhibitors of chitin biosynthesis may be Novaluron (C252), Chlorfluazuron (C246), Lufenuron (C251), Buprofezin (C256).

In an embodiment, moulting disruptors may be selected from cyromazine (C257) and the like.

In an embodiment, Ecdysone receptor agonists may be selected from Chromafenozide (C258), Halofenozide (C259), Methoxyfenozide (C260), Tebufenozide (C261) and mixtures thereof.

The preferred Ecdysone receptor agonists may be selected from Methoxyfenozide (C260).

In an embodiment, Octopamine receptor agonists may be selected from amitraz (C262) and the like.

In an embodiment, Mitochondrial complex electron transport inhibitors may be selected from Hydramethylnon (C263), Acequinocyl (C264), Fluacrypyrim (C265), Bifenazate (C266), Fenazaquin (C267), Fenpyroximate (C268), Pyridaben (C269), Pyrimidifen (C270), Tebufenpyrad (C271), Tolfenpyrad (C272), Rotenone (C273), Aluminium phosphide (C274), Calcium phosphide (C275), Phosphine (C276), Zinc phosphide (C277), Calcium cyanide (C278), Potassium cyanide (C279), Sodium cyanide (280), Cyenopyrafen (C281), Cyflumetofen (C282), Pyflubumide (C283) and mixtures thereof.

The preferred mitochondrial complex electron transport inhibitors may be Bifenazate (C266), Fenpyroximate (C268), Pyridaben (C269), Tebufenpyrad (C270), Tolfenpyrad (C271).

In an embodiment, Voltage-dependent sodium channel blockers may be selected from Indoxacarb (C272), Metaflumizone (C273) and mixtures thereof.

In an embodiment, Inhibitors of acetyl CoA carboxylase may be selected from Tetronic and Tetramic acid derivatives such as Spirodiclofen (C274), Spiromesifen (C275), Spirotetramat (C276) and, Spiropidion (C277) mixtures thereof.

In an embodiment, Chordotonal organ Modulators—undefined target site may be selected from Flonicamid (C278) and the like.

In an embodiment, the biopesticide may be selected from botanical insecticides such as azadirectin A (C279), euginol (C280), neem oil (C281), toosendanin (C282), 1-cinnamoyl-3-feruoyl-11-hydroxymeliacarpin (C283), volkensin (C284), d-limonene (C285), menthol, (C286) 1,8-cineole (C287), citronellal (C288), eugenol (C289), p-menthane-3,8-diol (C290), thymol (C291) and the like and mixtures thereof.

In an embodiment, the second fungicide is a combination of at least two more fungicides. In this embodiment, these fungicides are referred to herein as the second and the third fungicide respectively. However, the second and the third fungicide are never the same fungicides, although they can be a combination of two fungicides from the same class of fungicides.

In an embodiment, the second and/or third fungicide in the combinations of the present invention may be individually selected from nucleic acids synthesis inhibitors, cytoskeleton and motor protein inhibitors, amino acids and protein synthesis inhibitors, respiration process inhibitors, signal transduction inhibitors, lipid synthesis and membrane integrity disruptors, sterol biosynthesis inhibitors, melanin synthesis inhibitors, cell wall biosynthesis inhibitors, host plant defence inductors and/or fungicides with unknown modes of action.

Thus, in an embodiment, the nucleic acid synthesis inhibitor fungicide may be selected from acylalanines such as benalaxyl, benalaxyl-M (kiralaxyl), furalaxyl, metalaxyl, metalaxyl-M (mefenoxam), oxazolidinones such as oxadixyl, butyrolactones such as ofurace, hydroxy-(2-amino-) pyrimidines such as bupirimate, dimethirimol, ethirimol, isoxazoles such as hymexazole, isothiazolones such as octhilinone, carboxylic acids such as oxolinic acid.

In an embodiment, the cytoskeleton and motor protein inhibitors may be benzimidazoles such as benomyl, carbendazim, fuberidazole, thiabendazole; thiophanates such as thiophanate, thiophanate-methyl; N-phenyl carbamates such as diethofencarb; toluamides such as zoxamide; thiazole carboxamides such as ethaboxam; phenylureas such as pencycuron, benzamides such as fluopicolide; cyanoacrylates such as phenamacril.

In an embodiment, the respiration process inhibitor fungicides may be selected from pyrimidinamines such diflumetorim; pyrazole-5-carboxamides such as tolfenpyrad, strobilurins such as azoxystrobin, coumoxystrobin, enoxastrobin, flufenoxystrobin, picoxystrobin, pyraoxystrobin, mandestrobin, pyraclostrobin, pyrametostrobin, triclopyricarb, kresoxim-methyl, dimoxystrobin, fenaminostrobin, metominostrobin, trifloxystrobin, famoxadone, fluoxastrobin, fenamidone, pyribencarb and mixtures thereof; oxazolidine-diones such as famoxadone; Imidazolinones such as fenamidone; benzyl-carbamates such as pyribencarb; N-methoxy-(phenyl-ethyl)-pyrazole-carboxamides such as Pyrimidinamines such as diflumetorim; cyano-imidazole such as cyazofamid; sulfamoyl-triazole such as amisulbrom; dinitrophenyl crotonates such as binapacryl, meptyldinocap, dinocap; 2,6-dinitro-anilines such as fluazinam; pyr.-hydrazones such as ferimzone; tri-phenyl tin compounds such as fentin acetate, fentin chloride, fentin hydroxide; thiophene-carboxamides such as silthiofam; triazolo-pyrimidylamine such as ametoctradin.

In an embodiment, amino acids and protein synthesis inhibitor fungicides may be selected from anilino-pyrimidines such as cyprodinil, mepanipyrim, pyrimethanil, antibiotic fungicides such as blasticidin-S, kasugamycin, streptomycin, oxytetracycline and the like.

In an embodiment, signal transduction inhibitor fungicides may be selected from aryloxyquinolines such as quinoxyfen; quinazolinones such as proquinazid; phenylpyrroles such as fenpiclonil, fludioxonil; dicarboximides such as chlozolinate, dimethachlone, iprodione, procymidone and vinclozolin.

In an embodiment, the fungicide may be selected from lipid synthesis and membrane integrity disruptors such as phosphoro-thiolates such as edifenphos, Iprobenfos, pyrazophos; dithiolanes such as isoprothiolane; aromatic hydrocarbons such as biphenyl, chloroneb, dicloran, quintozene (PCNB), tecnazene (TCNB), tolclofos-methyl and the like; 1,2,4-thiadiazoles such as etridiazole; carbamates such as iodocarb, propamocarb, prothiocarb and the like.

Thus in an embodiment, the sterol biosynthesis inhibitors may be selected from triazoles such as azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, Ipconazole, metconazole, myclobutanil, penconazole, Propiconazole, simeconazole, tebuconazole, tetraconazole, triadimefon, triadimenol, triticonazole, prothioconazole, piperazines such as triforine; pyridines such as pyrifenox, pyrisoxazole; pyrimidines such as fenarimol, nuarimol imidazoles such as imazalil, oxpoconazole, pefurazoate, prochloraz, triflumizole; morpholines such as aldimorph, dodemorph, fenpropimorph, tridemorph and the like; piperidines such as fenpropidin, piperalin; spiroketalamines such as spiroxamine; hydroxyanilides such as fenhexamid; amino-pyrazolinones such as fenpyrazamine; thiocarbamates such as pyributicarb; allylamines such as naftifine, terbinafine and mixtures thereof.

In an embodiment, cell wall biosynthesis inhibitor fungicides may be selected from peptidyl pyrimidine nucleoside fungicides such as polyoxin, cinnamic acid amides such as dimethomorph, flumorph, pyrimorph; valinamide carbamates such as benthiavalicarb, iprovalicarb, valifenalate; mandelic acid amides such as mandipropamid and mixtures thereof.

In an embodiment, melanin synthesis inhibitor fungicide may be selected from isobenzo-furanone such as fthalide; pyrrolo-quinolinones such as pyroquilon; triazolobenzo-thiazoles such as tricyclazole; cyclopropane-carboxamides such as carpropamid; carboxamides such as diclocymet; propionamides such as fenoxanil; trifluoroethyl-carbamates such as tolprocarb; and mixtures thereof.

In an embodiment, host plant defence inductors fungicides may be selected from benzo-thiadiazoles such as acibenzolar-S-methyl; benzisothiazoles such as probenazole; thiadiazole-carboxamides such as tiadinil, isotianil; polysaccharides such as laminarin; and mixtures thereof.

In an embodiment, the additional second or third fungicide is a fungicide with unknown mode of action and may be selected from cyanoacetamide-oximes such as cymoxanil; ethyl phosphonates such as foestyl-Al, phosphorous acid and salts; phthalamic acids such as teclofthalam; benzotriazines such as triazoxide; benzene-sulphonamides such as flusulfamide; pyridazinones such as diclomezine; thiocarbamates such as methasulfocarb; phenyl-acetamides such as cyflufenamid; aryl-phenyl-ketones such as metrafenone, pyriofenone; guanidines such as dodine; cyano-methylene-thiazolidines such as flutianil; pyrimidinone-hydrazones such as ferimzone; piperidinyl-thiazole-isoxazolines such as oxathiapiprolin; 4-quinolyl-acetates such as tebufloquin; tetrazolyloximes such as picarbutrazox; glucopyranosyl antibiotics such as validamycin; fungicides such as mineral oil, organic oils, potassium bicarbonate and mixtures thereof.

In a preferred embodiment, the second fungicide in the combinations of the present invention may be selected from ergosterol biosynthesis inhibitors and Quinone outside (Qo) inhibitors.

In another preferred embodiment, the second fungicide and the third fungicide in the combinations of the present invention may be ergosterol biosynthesis inhibitors and Quinone outside (Qo) inhibitors respectively.

The ergosterol biosynthesis inhibitors may be selected from the group consisting of azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, Ipconazole, metconazole, myclobutanil, penconazole, Propiconazole, simeconazole, tebuconazole, tetraconazole, triadimefon, triadimenol, triticonazole, prothioconazole, imazalil, oxpoconazole, pefurazoate, prochloraz, triflumizole, fenarimol, nuarimol, pyrifenox, pyrisoxazole, and triforine.

In another embodiment, the ergosterol biosynthesis inhibitors may be selected from prothioconazole, tebuconazole, hexaconazole, cyroconazole or epoxiconazole.

In an embodiment, the third fungicide may be a Quinone outside (Qo) inhibitor fungicide selected from azoxystrobin, coumoxystrobin, enoxastrobin, flufenoxystrobin, picoxystrobin, pyraoxystrobin, mandestrobin, pyraclostrobin, pyrametostrobin, triclopyricarb, kresoxim-methyl, dimoxystrobin, fenaminostrobin, metominostrobin, trifloxystrobin, famoxadone, fluoxastrobin, fenamidone, and pyribencarb.

In an embodiment, the Quinone outside (Qo) inhibitor fungicide may be selected from azoxystrobin, picoxystrobin, kresoxim-methyl, pyraclostrobin and trifloxystrobin.

In an embodiment, the combinations of the present invention comprise a multisite fungicide.

In an embodiment, the multi-site fungicide is selected from the group consisting of dithiocarbamates, phthalimides, chloronitriles, inorganic fungicides, sulfamides, bisguanidines, triazines, quinones, quinoxalines, dicarboxamides and mixtures thereof.

In an embodiment, the multi-site fungicide is selected from the class of dithiocarbamate fungicides selected from asamobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb.

In an embodiment, the multi-site fungicide is a phthalimide fungicide selected from captan, captafol and folpet.

In an embodiment, the multi-site fungicide is a chloronitrile fungicide such as chlorothalonil.

In an embodiment, the multi-site fungicide is a sulfamide fungicide selected from dichlofluanid and tolylfluanid.

In an embodiment, the multi-site fungicide is a bisguanidine fungicide selected from guazatine and iminoctadine.

In an embodiment, the multi-site fungicide is a triazine fungicide selected from anilazine.

In an embodiment, the multi-site fungicide is a quinone fungicide selected from dithianon.

In an embodiment, the multi-site fungicide is a quinoxaline fungicide selected from quinomethionate and chlorquinox.

In an embodiment, the multi-site fungicide is a dicarboxamide fungicide selected from fluoroimide.

In an embodiment, the multi-site fungicide is an inorganic fungicide selected from copper fungicides including copper (II) hydroxide, copper oxychloride, copper (II) sulfate, basic copper sulfate, Bordeaux mixture, copper salicylate $C_7H_40_3$*Cu, cuprous oxide $CU_2O$; or sulphur.

In an embodiment, the present invention provides a combination comprising:

(a) at least one insecticide selected from broflanilide, chlorantraniliprole, cyantraniliprole, cyclaniliprole, flonicamid, fipronil, novaluron, imidacloprid, acetamipirid, emamectin, lambda cyhalothrin, cyhalodiamide, flubendiamide and tetraniliprole;

(a) at least one multisite fungicide; and (b) at least a silicic acid based plant health promoting additive.

In an embodiment, the present invention provides a combination comprising:

(a) broflanilide, chlorantraniliprole, cyantraniliprole, cyclaniliprole, flonicamid, fipronil, novaluron, imidacloprid, acetamipirid, emamectin, lambda cyhalothrin, cyhalodiamide, flubendiamide and tetraniliprole;

(b) at least one multisite fungicide; and (c) at least a silicic acid based plant health promoting additive; and (d) at least a first systemic fungicide and a second systemic fungicide.

In an embodiment, the multisite fungicide may be selected from:

(i) copper fungicides selected from copper oxychloride, copper sulfate, copper hydroxide and tribasic copper sulfate (Bordeaux mixture);

(ii) elemental sulfur;

(iii) dithiocarbamate fungicides selected from amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb;

(iv) phthalimide fungicides selected from folpet, captan and captafol;

(v) chlorothalonil;

(vi) sulfamide fungicides selected from dichlofluanid and tolylfluanid;

(vii) guanidine fungicides selected from dodine, guazantine and iminoctaadine;

(viii) anilazine;

(ix) dithianon; and (x) combinations thereof;

In an embodiment, the first and second systemic fungicides are preferably different from each other.

In an embodiment, when the multi-site contact fungicide is a combination of mancozeb and chlorothalonil, the preferred systemic fungicide is at least one systemic fungicide selected from quinone outside inhibitor, quinone inside inhibitor, demethylation inhibitor or a succinate dehydrogenase inhibitor.

In a preferred embodiment, the first and second systemic fungicides are selected from different classes of systemic fungicides. For example:

(i) when the first systemic fungicide is a demethylation inhibitor, the second systemic fungicide is selected from a quinone outside inhibitor, a quinone inside inhibitor and succinate dehydrogenase inhibitor; or when (ii) the first systemic fungicide is a quinone outside inhibitor, the second systemic fungicide is selected from a quinone inside inhibitor, demethylation inhibitor and succinate dehydrogenase inhibitor; or when (iii) the first systemic fungicide is a quinone inside inhibitor, the second systemic fungicide is selected from a quinone outside inhibitor, a demethylation inhibitor and a succinate dehydrogenase inhibitor; or when (iv) the first systemic fungicide is a succinate dehydrogenase inhibitor, the second systemic fungicide is selected from a quinone outside inhibitor, a quinone inside inhibitor and a demethylation inhibitor.

In an embodiment, the present invention provides a combination comprising:

(b) at least one insecticide selected from broflanilide, chlorantraniliprole, cyantraniliprole, cyclaniliprole, flonicamid, fipronil, novaluron, imidacloprid, acetamipirid, emamectin, lambda cyhalothrin, cyhalodiamide, flubendiamide and tetraniliprole;

(c) at least one multisite fungicide; and (d) at least a silicic acid based plant health promoting additive;

(e) a first systemic fungicide selected from a quinone outside inhibitor, a quinone inside inhibitor, demethylation inhibitor and succinate dehydrogenase inhibitor; and (f) a second systemic fungicide selected from a quinone outside inhibitor, a quinone inside inhibitor, demethylation inhibitor and succinate dehydrogenase inhibitor; such that (a) when the first systemic fungicide is a demethylation inhibitor, the second systemic fungicide is selected from a quinone outside inhibitor, a quinone inside inhibitor and succinate dehydrogenase inhibitor; or when (b) the first systemic fungicide is a quinone outside inhibitor, the second systemic fungicide is selected from a quinone inside inhibitor, demethylation inhibitor and succinate dehydrogenase inhibitor; or when (c) the first systemic fungicide is a quinone inside inhibitor, the second systemic fungicide is selected from a quinone outside inhibitor, a demethylation inhibitor and a succinate dehydrogenase inhibitor; or when (d) the first systemic fungicide is a succinate dehydrogenase inhibitor, the second systemic fungicide is selected from a quinone outside inhibitor, a quinone inside inhibitor and a demethylation inhibitor; or (e) when the multi-site contact fungicide is a combination of mancozeb and chlorothalonil, the systemic fungicide is at least one of a quinone outside inhibitor, a quinone inside inhibitor, a succinate dehydrogenase inhibitor and a demethylation inhibitor.

In a preferred embodiment, the preferred quinone outside inhibitor is a strobilurin fungicide and the preferred demethylation inhibitor is a conazole fungicide. In this embodiment, the preferred dithiocarbamate is selected from the group consisting of thiram, ziram, mancozeb, maneb, metiram, propineb and zineb.

In an embodiment, the quinone outside inhibitor may be selected from fenamidone, famoxadone, and a strobilurin fungicide selected from the group consisting of azoxystrobin, mandestrobin, coumoxystrobin, enoxastrobin, flufenoxystrobin, pyraoxystrobin, dimoxystrobin, enestrobin, fluoxastrobin, kresoxim-methyl, metominostrobin, orysastrobin, picoxystrobin, pyrametostrobin, triclopyricarb, fenaminstrobin, pyraclostrobin and trifloxystrobin.

In an embodiment, the quinone inside inhibitor may be selected from cyazofamid and amisulbrom.

In an embodiment, the demethylation inhibitor may be selected from triflumizole, triforine, pyridinitrile, pyrifenox, fenarimol, nuarimol, triarimol and a conazole fungicide selected from the group consisting of climbazole, clotrimazole, imazalil, oxpoconazole, prochloraz, prochloraz-manganese, triflumizole, azaconazole, bitertanol, bromuconazole, cyproconazole, diclobutrazol, difenoconazole, diniconazole, diniconazole-M, epoxiconazole, etaconazole, fenbuconazole, fluotrimazole, fluquinconazole, flusilazole, flutriafol, furconazole, furconazole-cis, hexaconazole, imibenconazole, ipconazole, metconazole, myclobutanil, pencoconazole, propiconazole, prothioconazole, quinconazole, simeconazole, tebuconazole, tetraconazole, triadimefon, triadimenol, triticonazole, uniconazole, perfurazoate and uniconazole-P.

In an embodiment, the succinate dehydrogenase inhibitor may be selected from the group consisting of benodanil, flutolanil, mepronil, fluopyram, fenfuram, carboxin, oxycarboxin, thifluzamide, bixafen, fluxapyroxad, furametpyr, isopyrazam, penflufen, penthiopyrad, sedaxane and boscalid.

In an embodiment, the second insecticidal compound in the combinations of the present invention may be selected from Acetylcholinesterase (AChE) inhibitors, GABA-gated chloride channel blockers, Sodium channel modulators, Nicotinic acetylcholine receptor (nAChR) competitive modulators, Nicotinic acetylcholine receptor (nAChR) allosteric modulators, Glutamate-gated chloride channel (GluCl) allosteric modulators, Juvenile hormone mimics, Chordotonal organ TRPV channel modulators, Mite growth inhibitors, Microbial disruptors of insect midgut membranes, Inhibitors of mitochondrial ATP synthase, Uncouplers of oxidative phosphorylation via disruption of the proton gradient, Nicotinic acetylcholine receptor (nAChR) channel blockers, Inhibitors of chitin biosynthesis, Moulting disruptors, Ecdysone receptor agonists, Octopamine receptor agonists, Mitochondrial complex electron transport inhibitors, Voltage-dependent sodium channel blockers, Inhibitors of acetyl CoA carboxylase, Chordotonal organ Modulators, multi-site miscellaneous insecticides, bioinsecticides and mixtures thereof In an embodiment, the present combinations may additionally contain other plant health promoting additives such as fertilizers, micronutrients, biological additives etc. that are known to enhance the growth and health of the plant.

In an embodiment of the combinations of the present invention, the preferred multisite fungicide is mancozeb and the preferred insecticidal compound is chlorantraniliprole and the plant health additive is stabilised orthosilicic acid.

In an embodiment of the combinations of the present invention, the preferred insecticidal compound is Cyantraniliprole.

In an embodiment of the combinations of the present invention, the preferred insecticidal compound is Flubendiamide.

In an embodiment of the combinations of the present invention, the preferred insecticidal compound is Flonicamid.

The combinations of the present invention may be formulated in the form of a composition.

In an embodiment, the present invention may provide a composition comprising:

(i) at least one insecticide;

(ii) at least a silicic acid based plant health promoting additive; and (iii) at least one agrochemically acceptable excipient.

In a preferred embodiment, the present invention provides a composition for controlling insects comprising:

(i) at least one insecticidal compound;

(ii) ortho silicic acid; and (iii) at least one agrochemically acceptable excipient.

In an embodiment, the present invention may provide a composition comprising:

(i) at least one insecticide;

(ii) at least one multi-site fungicide;

(iii) at least a silicic acid based plant health promoting additive; and (iv) at least one agrochemically acceptable excipient.

In a preferred embodiment, the present invention may provide a composition comprising:

(i) at least one insecticidal compound;

(ii) at least one dithiocarbamate fungicide;

(iii) stabilised orthosilicic acid; and (iv) at least one agrochemically acceptable excipient.

In an embodiment, the present invention may provide a composition comprising:

(a) at least one insecticidal compound;

(b) at least one dithiocarbamate fungicide;

(c) stabilished orthosilicic acid;

(c) at least one fungicide or insecticide other than the insecticide or the dithiocarbamate fungicide; and (d) at least one agrochemically acceptable excipient.

In an embodiment, the present invention may provide a composition comprising:

(a) at least one insecticidal compound;

(b) at least one dithiocarbamate fungicide;

(c) stabilized orthosilicic acid;

(d) at least one other health promoting additive selected from fertilizers, micronutrients, mycorrhiza, biological additves that enhance plant growth; and (e) at least one agrochemically acceptable excipient.

Thus, in an embodiment, the present invention provides compositions for controlling insects comprising:

(a) at least one insecticide selected from broflanilide, chlorantraniliprole, cyantraniliprole, cyclaniliprole, flonicamid, fipronil, novaluron, imidacloprid, acetamipirid, emamectin, lamblda cyhalothrin, cyhalodiamide, flubendiamide and tetraniliprole;

(b) stabilized orthosilicic acid; and (c) at last one dithiocarbamate fungicide.

In an embodiment the compositions of present invention may comprise pesticide active a compound and a biocontrol agent or biostimulant viz., natural extract based biostimulants, microbial biostimulants.

In an embodiment the compositions of present invention may comprise biological control agents/biostimulants in combination with active compounds in the composition.

Some examples of such agents include but not limited to seaweed extract, algae extract, superabsorbent polymer, Laminarin, Kasumin and the like.

The biological control agents that are members of the species *Bacillus* are used as blocontrol strains, for example, some commercial biocontrol products include: *Bacillus pumilus* strain Q5T2808, used as active ingredient in SONATA® and BALLAD®-PLUS; *Bacillus pumilus* strain GB34, used as active ingredient in YIELDSHIELD, *Bacillus subtilis* strain Q01713, used as the active ingredient of SERENADE®; *Bacillus subtilis* strain GBO3, used as the active ingredient in KODIAK® and SYSTEM3®. Other strains of *Bacillus thuringiensis* and *Bacillus firmus* have been applied as biocontrol agents against nematodes and vector insects and these strains serve as the basis of numerous commercially available biocontrol products, including NORTICA and PONCHO®-VOTIVO®. Similarly, *Bacillus* strains used in commercial biostimulant products include: *Bacillus amyloliquefaciens* strain FZB42 used as the active ingredient in RHIZOVITAL® 42, as well as various other

*Bacillus subtilus* species that are included as whole cells including their fermentation extract in biostimulant products, such as FULZYME Other plant growth regulators include the following: Plant Growth Regulators: 1) Antlauxins, such as dofibric acid, 2,3,5-tri-iodobenzoic acid; 2) Auxins such as 4-CPA, 2,4-D, 2,4-DB, 2,4-DEP, dichlorprop, fenoprop, IAA, IBA, naphthaleneacetamide, α-naphthaleneacetic acids, 1-naphthol, naphthoxyacetic acids, potassium naphthenate, sodium naphthenate, 2,4,5-T; 3) cytokinins, such as 2iP, benzyladenine, 4-hydroxyphenethyl alcohol, kinetin, zeatin; 4) defoliants, such as calcium cyanamide, dimethipin, endothal, ethephon, merphos, metoxuron, pentachlorophenol, thidiazuron, tribufos; 5) ethylene inhibitors, such as aviglycine, 1-methylcyclopropene; 6) ethylene releasers, such as ACC, etacelasil, ethephon, glyoxime; 7) gametocides, such as fenridazon, maleic hydrazide; 8) gibberellins, such as gibberellins, gibberellic acid; 9) growth inhibitors, such as abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat, piproctanyl, prohydrojasmon, propham, tiaojiean, 2,3,5-tri-iodobenzoic acid; 10) morphactins, such as chlorfluren, chlorflurenol, dichlorflurenol, flurenol; 11) growth retardants, such as chlormequat, daminozide, flurprimidol, mefluidide, paclobutrazol, tetcyclads, uniconazole; 12) growth stimulators, such as brassinolide, brassinolide-ethyl, DCPTA, forchlorfenuron, hymexazol, prosuler, triacontanol; 13) unclassified plant growth regulators, such as bachmedesh, benzofluor, buminafos, carvone, choline chloride, ciobutide, clofencet, cyanamide, cyclanilide, cycloheximide, cyprosulfamide, epocholeone, ethychlozate, ethylene, fuphenthiourea, furalane, heptopargil, holosulf, inabenfide, karetazan, lead arsenate, methasulfocarb, prohexadione, pydanon, sintofen, triapenthenol, and trinexapac.

Some biostimulant which can be used include, Macarena (seaweed product), Brique, Wuxal, Optiene/Plantonik, Biozyme, Gibberellic acid (algae extract), Retrosal® (containing calcium, zinc, and specific active ingredients, K-tinonic (fulvic acid), Humitron (Humic acid), Foltron® (Folcisteine), Generate, Crop Set, Fulcrum, and Redicrop 2000, Yoduo, Stimulate®, CROP+®, SEED+®, Carbonsolo®, Kymon Plus®, which are composed of arginine, serine, phenylalanine, alanine, aspartic acid, glycine, proline and hydroxyproline, glutamic acid, tryptophan, and valine. Various biostimulants commercially available include, Pollinus (seaweed product), TurfVigor and CPR (containing seaweed extract) Vilatus, Raizal® (NPK supplement), K-Fol (fertilizer), Head Set® (seaweed filtrate based) and Atonik (nitrophenolate based PGR) and the like.

In an embodiment, the total amount of insecticidal compound in the composition may typically be in the range of 0.1 to 99% by weight, preferably 0.2 to 90% by weight more preferably 10 to 80% by weight of the composition. The total amount of dithiocarbamate fungicide in the composition may be in the range of 0.1 to 99% by weight. The total amount of silicic acid based plant heath promoting additive in the composition may be in the range of 0.1 to 99% by weight. The total amount of second fungicide/insecticide/plant growth additive in the composition may be in the range of 0.1 to 99% by weight.

In an embodiment, the constituent of the combination of the present inventions can be admixed in ratio of (1-80):(1-80):(1-80) of the dithiocarbamate fungicide, anthranilamide insecticidal compound and the silicic acid based plant health additive respectively.

In an embodiment, the constituents of the compositions of the present invention can be tank mixed and sprayed at the locus of the infection, or may be alternatively be mixed with surfactants and then sprayed.

In an embodiment, the constituents of the composition of the present invention may be used for foliar application, ground or applications to plant propagation materials.

In an embodiment, the combinations and compositions according to the invention can be converted into customary formulations, typically by mixing the actives in the composition with an inert carrier, and adding surfactants and other adjuvants and carriers as needed and formulated into solid, or liquid formulations, including but not limited to wettable powders, granules, dusts, Soluble (liquid) concentrates, suspension concentrates, oil in water emulsion, water in oil emulsion, emulsifiable concentrates, capsule suspensions, ZC formulations, oil dispersions or other known formulation types. The composition may also be used for treatment of a plant propagation material such as seeds etc.

These formulations are produced in the known manner, for example by mixing the active compound (s) with suitable extenders, that is, liquid solvents and/or solid carriers, optionally with the use of surfactants, that is, emulsifiers and/or dispersants.

Examples of the solid carrier used in formulation include fine powders or granules such as minerals such as kaolin clay, attapulgite clay, bentonite, montmorillonite, acid white clay, pyrophyllite, talc, diatomaceous earth and calcite; natural organic materials such as corn rachis powder and walnut husk powder; synthetic organic materials such as urea; salts such as calcium carbonate and ammonium sulfate; synthetic inorganic materials such as synthetic hydrated silicon oxide; and as a liquid carrier, aromatic hydrocarbons such as xylene, alkylbenzene and methylnaphthalene; alcohols such as 2-propanol, ethyleneglycol, propylene glycol, and ethylene glycol monoethyl ether; ketones such as acetone, cyclohexanone and isophorone; vegetable oil such as soybean oil and cotton seed oil; petroleum aliphatic hydrocarbons, esters, dimethylsulfoxide, acetonitrile and water.

Examples of the surfactant include anionic surfactants such as alkyl sulfate ester salts, alkylaryl sulfonate salts, dialkyl sulfosuccinate salts, polyoxyethylene alkylaryl ether phosphate ester salts, lignosulfonate salts and naphthalene sulfonate formaldehyde polycondensates; and nonionic surfactants such as polyoxyethylene alkyl aryl ethers, polyoxyethylene alkylpolyoxypropylene block copolymers and sorbitan fatty acid esters and cationic surfactants such as alkyltrimethylammonium salts.

Examples of the other formulation auxiliary agents include water-soluble polymers such as polyvinyl alcohol and polyvinylpyrrolidone, polysaccharides such as Arabic gum, alginic acid and the salt thereof, CMC (carboxymethyl-cellulose), Xanthan gum, inorganic materials such as aluminum magnesium silicate and alumina sol, preservatives, coloring agents and stabilization agents such as PAP (acid phosphate isopropyl) and BHT.

While a certain effect on insecticidal control of the insecticide or combinations have been reported, and concomitantly a reduced amount of insecticides necessary for effectively controlling pests, considering environmental protection and consumer interests call for even lower rates in terms of individual applications and amounts of such compositions particularly in the agricultural sector.

Accordingly, the present invention provides a more effective and synergistic insecticidal compositions which reduces the need of applying large quantities of the composition on plants in order to effectively control pests such as certain insects.

In another embodiment, the present compositions are applied with low dose of insecticide in combination with at least a silicic acid based plant health promoting additive.

A method according to an embodiment of the present invention allows to cut the amount of insecticide previously used by at least 10% preferably 20%, more preferably 25%, even more preferably 30%.

The amount of a composition according to the invention to be applied, will depend on various factors, such as the subject of the treatment, such as, for example plants, soil or seeds; the type of treatment, for example as a foliar spray and applied either pre-emergence, post-emergence or both, dusting or seed dressing such as in the form of a seed coating, soil drench, and/or directly in-furrow; for the purpose of the treatment, such as, for example prophylactic or therapeutic disease control. This amount of the combinations of the present invention to be applied can be readily deduced by a skilled agronomist.

The formulations of the present invention applied either straight (that is undiluted) or diluted with a suitable solvent, especially water, to the plants, plant parts and/or the surrounding can be treated and protected against insects by spraying, pouring or immersing. Usually, the formulation can be diluted with water. Depending on the desired effect, the application rates of active ingredient are from about 1 g/ha to about 2500 g/ha, preferably from about 10 g/ha to about 1500 g/ha, more preferably from about 100 g/ha to about 1000 g/ha.

In one preferred embodiment, application of flonicamid in an amount in the range of about 75 g a.i./ha to 150 a.i./ha (150 g/ha to 300 g/ha) and ortho-silicic acid in an amount of about 20 g a.i./ha to 25 g a.i./ha (1000 ml/ha to 1250 ml/ha) provide synergistic control on insects.

The composition of the present invention can be applied with the active insecticide components obtained from a separate formulation source and mixed together for example as a tank-mix, ready-to-apply, spray broth, or slurry, optionally with other pesticides, or the active insecticide components can be obtained as a single formulation mixture for example as a pre-mix, concentrate, formulated compound (or product), and optionally mixed together with other pesticides before being applied. The active compound content in the commercially available formulations can vary.

The active components of the composition can be applied to the plants, plant parts and/or their surroundings where control is desired either simultaneously or sequentially, for example on the same day in any order. The composition may be applied just once or a plurality of times. Preferably, composition is applied a plurality of times, for example 1 to 6 times preferably about 2 to 5 times within an interval of 5 days to 20 days for example the compositions are applied within an interval of 10 days to 15 days after each application.

Typically, the compositions are applied at least two-time depending on economic threshold level of insects.

In an embodiment, the compositions of the present invention provided for use in controlling pests selected from insects, mites, nematodes and/or phytopathogens containing at least one insecticide and ortho silicic acid.

Depending on the nature of the active substance employed, the formulations according to the invention are suitable for any useful plants, for example grain crops, root crops, oil crops, vegetables, spices, ornamentals and the like, for example for the treatment of following plants: durum wheat and other wheat species, oats, rye, barley, maize, including fodder maize and sugar maize, soybeans, brassicas, okra, cotton, sunflower, bananas, rice, oilseed rape, beet, sugarbeet, fodder beet, aubergines, potatoes, turf, grass seed, tomatoes, leek, pumpkin/squash, cabbage, lettuces, bell peppers, cucumbers, melons, beans, peas, garlic, onions, carrots, tobacco, grapes, petunias, geraniums, pelargoniums, pansies, and the like.

In another aspect of the present invention provides a method for reducing overall damage of plants and plant parts in addition to losses in harvested fruits or vegetables caused by insects, nematodes and/or phytopathogens and improving the yield and/or vigour of the plant comprising applying simultaneously or sequentially, a synergistically effective amount of the pesticidal combination comprising at least one insecticide and plant growth promoting agent and optionally at least one fungicide on the plant, plant parts, harvested fruits, vegetables and/or plant's locus of growth.

When it is said that the present method is capable of "improving the yield and/or vigour" of a plant, the present method results in an increase in either the yield, as described above, or the vigor of the plant, as described above, or both the yield and the vigor of the plant.

The compositions according to the present invention is effective for the following plant diseases:

Disease in rice: Blast (*Magnaporthe grisea*), Helminthosporium leaf spot (*Cochliobolus miyabeanus*), sheath blight (*Rhizoctonia solani*), and bakanae disease (*Gibberella fujikuroi*).

Diseases in wheat: powdery mildew (*Erysiphe graminis*), Fusariuin head blight (*Fusarium graminearum, F. avenacerum, F. culmorum, Microdochium nivale*), rust (*Puccinia striiformis, P. graminis, P. recondita*), pink snow mold (*Micronectriella nivale*), Typhula snow blight (*Typhula* sp.), loose smut (*Ustilago tritici*), bunt (Tilletia caries), eyespot (*Pseudocercosporella herpotrichoides*), leaf blotch (*Mycosphaerella graminicola*), glume blotch (*Stagonospora nodorum*), septoria, and yellow spot (*Pyrenophora tritici-repentis*).

Diseases of barley: powdery mildew (*Erysiphe graminis*), Fusarium head blight (*Fusarium graminearum, F. avenacerum, F. culmorum, Microdochium nivale*), rust (*Puccinia striiformis, P. graminis, P. hordei*), loose smut (*Ustilago nuda*), scald (*Rhynchosporium secalis*), net blotch (*Pyrenophora teres*), spot blotch (*Cochliobolus sativus*), leaf stripe (*Pyrenophora graminea*), and Rhizoctonia damping-off (*Rhizoctonia solani*).

Diseases in corn: smut (*Ustilago maydis*), brown spot (*Cochliobolus heterostrophus*), copper spot (*Gloeocercospora sorghi*), southern rust (*Puccinia polysora*), gray leaf spot (*Cercospora zeae-maydis*), white spot (*Phaeosphaeria mydis* and/or *Pantoea ananatis*) and Rhizoctonia damping-off (*Rhizoctonia solani*).

Diseases of citrus: melanose (*Diaporthe citri*), scab (*Elsinoe fawcetti*), penicillium rot (*Penicillium digitatum, P. italicum*), and brown rot (*Phytophthora parasitica, Phytophthora citrophthora*).

Diseases of apple: blossom blight (*Monilinia mali*), canker (*Valsa ceratosperma*), powdery mildew (*Podosphaera leucotricha*), Alternaria leaf spot (*Alternaria alternata* apple pathotype), scab (*Venturia inaequalis*), powdery mildew, bitter rot (*Colletotrichum acutatum*), crown rot (*Phytophtora cactorum*), blotch (*Diplocarpon mali*), and ring rot (*Botryosphaeria berengeriana*).

Diseases of pear: scab (*Venturia nashicola, V. pirina*), powdery mildew, black spot (*Alternaria alternata* Japanese pear pathotype), rust (*Gymnosporangium haraeanum*), and phytophthora fruit rot (*Phytophtora cactorum*).

Diseases of peach: brown rot (*Monilinia fructicola*), powdery mildew, scab (*Cladosporium carpophilum*), and phomopsis rot (*Phomopsis* sp.).

Diseases of grape: anthracnose (*Elsinoe ampelina*), ripe rot (*Glomerella cingulata*), powdery mildew (*Uncinula necator*), rust (*Phakopsora ampelopsidis*), black rot (*Guignardia bidwellii*), botrytis, and downy mildew (*Plasmopara viticola*).

Diseases of Japanese persimmon: anthracnose (*Gloeosporium kaki*), and leaf spot (*Cercospora kaki, Mycosphaerella nawae*).

Diseases of gourd: anthracnose (*Colletotrichum lagenarium*), powdery mildew (*Sphaerotheca fuliginea*), gummy stem blight (*Mycosphaerella melonis*), Fusarium wilt (*Fusarium oxysporum*), downy mildew (*Pseudoperonospora cubensis*) *Phytophthora* rot (*Phytophthora* sp.), and damping-off (*Pythium* sp.).

Diseases of tomato: early blight (*Alternaria solani*), leaf mold (*Cladosporium fulvum*), and late blight (*Phytophthora infestans*).

Diseases of eggplant: brown spot (*Phomopsis vexans*), and powdery mildew (*Erysiphe cichoracearum*) Diseases of cruciferous vegetables: *Alternaria* leaf spot (*Alternaria japonica*), white spot (*Cercosporella brassicae*), clubroot (*Plasmodiophora brassicae*), and downy mildew (*Peronospora parasitica*).

Diseases of onion: rust (*Puccinia allii*), and downy mildew (*Peronospora* destructor) Diseases of soybean: purple seed stain (*Cercospora kikuchii*), sphaceloma scad (*Elsinoe glycines*), pod and stem blight (*Diaporthe phaseolorum* var. *sojae*), septoria brown spot (*Septoria glycines*), frogeye leaf spot (*Cercospora sojina*), rust (*Phakopsora pachyrhizi*), Yellow rust, brown stem rot (*Phytophthora sojae*), and Rhizoctonia damping-off (*Rhizoctonia solani*).

Diseases of kidney bean: anthracnose (*Colletotrichum lindemthianum*). Diseases of peanut: leaf spot (*Cercospora personata*), brown leaf spot (*Cercospora arachidicola*) and southern blight (*Sclerotium rolfsii*).

Diseases of garden pea: powdery mildew (*Erysiphe pisi*), and root rot (*Fusarium solani* f. sp. *pisi*).

Diseases of potato: early blight (*Alternaria solani*), late blight (*Phytophthora infestans*), pink rot (*Phytophthora erythroseptica*), and powdery scab (*Spongospora subterranean* f. sp. *subterranea*).

Diseases of strawberry: powdery mildew (*Sphaerotheca humuli*), and anthracnose (*Glomerella cingulata*).

Diseases of tea: net blister blight (*Exobasidium reticulatum*), white scab (*Elsinoe leucospila*), gray blight (*Pestalotiopsis* sp.), and anthracnose (*Colletotrichum theae-sinensis*).

Diseases of tobacco: brown spot (*Alternaria longipes*), powdery mildew (*Erysiphe cichoracearum*), anthracnose (*Colletotrichum tabacum*), downy mildew (*Peronospora tabacina*), and black shank (*Phytophthora nicotianae*).

Diseases of rapeseed: sclerotinia rot (*Sclerotinia sclerotiorum*), and Rhizoctonia damping-off (*Rhizoctonia solani*). Diseases of cotton: *Rhizoctonia* damping-off (*Rhizoctonia solani*).

Diseases of sugar beat: Cercospora leaf spot (*Cercospora beticola*), leaf blight (*Thanatephorus cucumeris*), Root rot (*Thanatephorus cucumeris*), and Aphanomyces root rot (*Aphanomyces cochlioides*).

Diseases of rose: black spot (*Diplocarpon rosae*), powdery mildew (*Sphaerotheca pannosa*), and downy mildew (*Peronospora sparsa*). Diseases of chrysanthemum and asteraceous plants: downy mildew (*Bremia lactucae*), leaf blight (*Septoria chrysanthemi-indici*), and white rust (*Puccinia horiana*).

Diseases of various groups: diseases caused by *Pythium* spp. (*Pythium aphanidermatum, Pythium debarianum, Pythium graminicola, Pythium irregulare, Pythium ultimum*), gray mold. (*Botrytis cinerea*), and Sclerotinia rot (*Sclerotinia sclerotiorum*).

Disease of Japanese radish: Alternaria leaf spot (*Alternaria brassicicola*).

Diseases of turfgrass: dollar spot (*Sclerotinia homeocarpa*), and brown patch and large patch (*Rhizoctonia solani*).

Disease of banana: Black sigatoka (*Mycosphaerella fijiensis*), Yellow sigatoka (*Mycosphaerella musicola*).

Disease of sunflower: downy mildew (*Plasmopara halstedii*).

Seed diseases or diseases in the early stages of the growth of various plants caused by *Aspergillus* spp., *Penicillium* spp., *Fusarium* spp., *Gibberella* spp., *Tricoderma* spp., *Thielaviopsis* spp., *Rhizopus* spp., *Mucor* spp., *Corticium* spp., *Phoma* spp., *Rhizoctonia* spp. and *Diplodia* spp.

Viral diseases of various plants mediated by *Polymixa* spp. or *Olpidium* spp. and so on.

In an embodiment the present invention provides a method of controlling insects or preventing damage to a plant, comprising applying to the plant, part of a plant, plant organ, and/or plant propagation material thereof, a synergistically effective amount of combination comprising at least one insecticide and at least one plant health promoting agent.

The compositions according to the present invention is synergistically effective for the following plant treatments against pests preferably insects.

In an embodiment the insect pests controlled by the combinations of the present invention may belong to the class Insecta, Arachnida and Nematoda. Exemplary pests may include: from the order Lepidoptera, pests such as *Acleris* spp., *Adoxophyes* spp., *Aegeria* spp., *Agrotis* spp., *Alabama argillaceae, Amylois* spp., *Anticarsia gemmatalis, Archips* spp., *Argyrotaenia* spp., *Autographa* spp., *Busseola fusca, Cadra cautella, Carposina nipponensis, Chilo* spp., *Choristoneura* spp., *Clysia ambiguella, Cnaphalocrocis* spp., *Cnephasia* spp., *Cochylis* spp., *Coleophora* spp., *Crocidolomia* spp., *Cryptophlebia leucotreta, Crysodeixis includens, Cydia* spp., *Diatraea* spp., *Diparopsis castanea, Earias* spp., *Elasmopalpus* spp., *Ephestia* spp., *Eucosma* spp., *Eupoecilia ambiguella, Euproctis* spp., *Euxoa* spp., *Grapholita* spp., *Hedya nubiferana, Heliothis* spp., *Hellula undalis, Hyphantria cunea, Keiferia lycopersicella, Leucoptera scitella, Lithocollethis* spp., *Lobesia botrana, Lymantria* spp., *Lyonetia* spp., *Malacosoma* spp., *Mamestra brassicae, Manduca sexta, Operophtera* spp., *Ostrinia nubilalis, Pammene* spp., *Pandemis* spp., *Panolis flammea, Pectinophora gossypiella, Phthorimaea operculella, Pieris rapae, Pieris* spp., *Plutella xylostella, Prays* spp., *Scirpophaga* spp., *Sesamia* spp., *Sparganothis* spp., *Spodoptera* spp., *Synanthedon* spp., *Thaumetopoea* spp., *Tortrix* spp., *Trichoplusia ni* and *Yponomeuta* spp.; from the order Coleoptera, pest such as *Agriotes* spp., *Anthonomus* spp., *Atomaria linearis, Ceutorhynchus* spp., *Chaetocnema tibialis, Cosmopolites* spp., *Curculio* spp., *Dermestes* spp., *Diabrotica* spp., *Epilachna* spp., *Eremnus* spp., *Gonocephalum* spp., *Heteronychus* spp., *Leptinotarsa decemlineata, Lissorhoptrus* spp., *Melolontha* spp., *Orycaephilus* spp., *Otiorhynchus* spp., *Phlyctinus* spp., *Phyllotreta* spp., *Popillia* spp., *Protostrophus* spp., *Psylliodes* spp., *Rhizopertha* spp.,

*Scarabeidae, Sitophilus* spp., *Sitotroga* spp., *Tenebrio* spp., *Tribolium* spp. and *Trogoderma* spp.; from the order Orthoptera, pests such as *Blatta* spp., *Blattella* spp., *Gryllotalpa* spp., *Leucophaea maderae, Locusta* spp., *Periplaneta* spp. and *Schistocerca* spp.; from the order Isoptera, pests such as *Reticulitermes* spp.; from the order Psocoptera pest such as, *Liposcelis* spp.; from the order Anoplura, pests such as *Haematopinus* spp., *Linognathus* spp., *Pediculus* spp., *Pemphigus* spp. and *Phylloxera* spp.; from the order Mallophaga pests such as *Damalinea* spp. and *Trichodectes* spp.; from the order Thysanoptera, pests such as *Frankliniella* spp., *Hercinothrips* spp., *Taeniothrips* spp., *Thrips palmi, Thrips tabaci* and *Scirtothrips aurantii*; from the order Heteroptera, pests such as *Dichelops melacanthus, Distantiella theobroma, Dysdercus* spp., *Euchistus* spp., *Eurygaster* spp., *Leptocorisa* spp., *Nezara* spp., *Piesma* spp., *Rhodnius* spp., *Sahlbergella singularis, Scotinophara* spp. and *Triatoma* spp.; from the order Homoptera, insect pests such as *Aleurothrixus floccosus, Aleyrodes brassicae, Aonidiella* spp., *Aphididae, Aphis* spp., *Aspidiotus* spp., *Bemisia tabaci, Ceroplaster* spp., *Chrysomphalus aonidium, Chrysomphalus dictyospermi, Coccus hesperidum, Empoasca* spp., *Eriosoma larigerum, Erythroneura* spp., *Gascardia* spp., *Laodelphax* spp., *Lecanium corni, Lepidosaphes* spp., *Macrosiphus* spp., *Myzus* spp., *Nephotettix* spp., *Nilaparvata* spp., *Paratoria* spp., *Pemphigus* spp., *Planococcus* spp., *Pseudaulacaspis* spp., *Pseudococcus* spp., *Psylla* spp., *Pulvinaria aethiopica, Quadraspidiotus* spp., *Rhopalosiphum* spp., *Saissetia* spp., *Scaphoideus* spp., *Schizaphis* spp., *Sitobion* spp., *Trialeurodes vaporariorum, Trioza erytreae* and *Unaspis citri*; from the order Hymenoptera, insect pests such as *Acromyrmex, Athalia rosae, Atta* spp., *Cephus* spp., *Diprion* spp., *Diprionidae, Gilpinia polytoma, Hoplocampa* spp., *Lasius* spp., *Monomorium pharaonis, Neodiprion* spp., *Solenopsis* spp. and *Vespa* spp.; from the order Diptera, insect pests such as *Antherigona soccata, Bibio hortulanus, Ceratitis* spp., *Chrysomyia* spp., *Culex* spp., *Cuterebra* spp., *Dacus* spp., *Delia* spp., *Drosophila melanogaster, Liriomyza* spp., *Melanagromyza* spp., *Orseolia* spp., *Oscinella frit, Pegomyia hyoscyami, Phorbia* spp., *Rhagoletis pomonella, Sciara* spp.; from the order Acarina, pests such as *Acarus siro, Aceria sheldoni, Aculus schlechtendali, Amblyomma* spp., *Argas* spp., *Brevipalpus* spp., *Bryobia praetiosa, Calipitrimerus* spp., *Chorioptes* spp., *Dermanyssus gallinae, Eotetranychus carpini, Eriophyes* spp., *Hyalomma* spp., *Olygonychus pratensis, Ornithodoros* spp., *Panonychus* spp., *Phyllocoptruta* spp. (such as *Phyllocoptruta oleivora*), *Polyphagotarsonemus latus, Psoroptes* spp., *Rhipicephalus* spp., *Rhizoglyphus* spp., *Sarcoptes* spp., *Tarsonemus* spp. and *Tetranychus* spp.; and from the class Nematoda, the species of *Meloidogyne* spp. (for example, *Meloidogyne incoginita* and *Meloidogyne javanica*), *Heterodera* spp. (for example, *Heterodera glycines, Heterodera schachtii, Heterodora avenae* and *Heterodora trifolii*), *Globodera* spp. (for example, *Globodera rostochiensis*), *Radopholus* spp. (for example, *Radopholus similes*), *Rotylenchulus* spp., *Pratylenchus* spp. (for example, *Pratylenchus neglectans* and *Pratylenchus penetrans*), *Aphelenchoides* spp., *Helicotylenchus* spp., *Hoplolaimus* spp., *Paratrichodorus* spp., *Longidorus* spp., *Nacobbus* spp., *Subanguina* spp. *Belonlaimus* spp., *Criconemella* spp., *Criconemoides* spp. *Ditylenchus* spp., *Dolichodorus* spp., *Hemicriconemoides* spp., *Hemicycliophora* spp., *Hirschmaniella* spp., *Hypsoperine* spp., *Macroposthonia* spp., *Melinius* spp., *Punctodera* spp., *Quinisulcius* spp., *Scutellonema* spp., *Xiphinema* spp., and *Tylenchorhynchus* spp.

The synergistic insecticidal composition of the invention is found to be highly active against a wide variety of chewing, boring and sucking insects, e.g. Aphids, thrips, lepidopterous larvae, sawflies, leafminers, leafhoppers, cutworms, whiteflies, soil insects, termites and some species of bitting insects, such as rice water weevil on Colorado beetle etc.

Preferably, the insecticidal composition of the invention is found to be highly active against insects for example sucking pest such as aphids, Jassids and fall armyworm.

Preferably, the insecticidal composition of the invention provides synergistic control of fall aphids and Jassids in okra crop.

In preferred embodiment, the insecticidal composition comprising Flonicamid and ortho silicic acid provides synergistic control of Aphids and Jassids in okra crop.

In preferred embodiment, the insecticidal composition comprising acetamipride and ortho silicic acid provides synergistic control of Aphids and Jassids in okra crop.

In preferred embodiment, the insecticidal composition comprising Imidacloprid and ortho silicic acid provides synergistic control of Aphids and Jassids in okra crop.

In preferred embodiment, the insecticidal composition comprising Imidacloprid, acephate and ortho silicic acid provides synergistic control of Aphids and Jassids in okra crop.

In preferred embodiment, the synergistic insecticidal composition comprising Flonicamid, fipronil and ortho silicic acid provides synergistic control of Aphids and Jassids in okra crop.

In another embodiment, the synergistic insecticidal composition of the invention is found to be highly active against fall armyworm (FAW).

FAW (*Spodoptera frugiperda*) is a lepidopteran polyphagous pest native to tropical and subtropical regions, one of the most important maize pests. It belongs to the genus *Spodoptera*, known as armyworms, the group of Noctuidae that causes the highest monetary losses to agriculture worldwide.

Preferably, the synergistic insecticidal combination of the invention comprising at least one insecticide and plant growth promoting agent provide at least 10% to 15% increase in the control of fall armyworm than without plant growth promoting agent treatments.

In preferred embodiment, the insecticidal composition comprising chlorotroniprole and ortho silicic acid provides synergistic control of fall armyworm in corn crop.

In preferred embodiment, the insecticidal composition comprising Novaluron and ortho silicic acid (OSA) provides synergistic control of fall armyworm in corn crop.

In preferred embodiment, the insecticidal composition comprising Novaluron, Lambda cyhaothrin and ortho silicic acid provides synergistic control of fall armyworm in corn crop.

In preferred embodiment, the insecticidal composition comprising Novaluron, Emamectin and ortho silicic acid provides synergistic control of fall armyworm in corn crop.

Thus, in an embodiment, the present invention provides a combination comprising Flonicamid and ortho-silicic acid for synergistic control of insects.

In an embodiment, the present invention provides a composition comprising the combination as described in any of the above embodiments, and at least one agrochemically acceptable excipient.

In another aspect, the present invention provides a method to reduce the amount of insecticide in the formulation and application rates and broaden the activity the insecticide(s) against insects, mites, nematodes and/or phytopathogens.

In another aspect, the present invention provides a method of controlling fungal and/or insecticidal pests at a locus and promoting health of the plant, said method comprising applying a combination comprising at least one insecticide and at least one plant health promoting agent optionally at least one fungicide.

In another aspect, the present invention provides a method of treating plant from pests comprising applying a combination of at least one insecticide and at least one plant health promoting agent optionally at least one fungicide.

In another aspect, the present invention provides a method for partial or complete preventive and/curative treatment of plant or propagation material thereof using a insecticidal composition comprising at least one insecticide and at least one plant health promoting agent.

In another aspect the present invention provides a method of controlling unwanted pests on plants or propagation material thereof, said method comprising applying an agrochemically effective amount of a combination to the pests or to their locus, comprising at least one insecticide and at least one plant health promoting agent optionally with one or more agrochemically acceptable excipients.

In an embodiment, the present invention provides a method of controlling Aphids in Okra comprising applying, to the locus, a combination or a composition as described in any of the above embodiments.

In an embodiment, the present invention provides a method of controlling Jassids in Okra comprising applying, to the locus, a combination or a composition of present invention.

In an embodiment, the present invention provides a method of controlling Fall Army Worm in corn comprising applying, to the locus to be treated, a combination or a composition of present invention.

Thus, in an embodiment, the present invention provides a combination comprising Flonicamid and ortho-silicic acid.

Thus, in an embodiment, the present invention provides a combination comprising acetamipirid and ortho-silicic acid.

Thus, in an embodiment, the present invention provides a combination comprising acephate, imidaloprid and ortho-silicic acid.

Thus, in an embodiment, the present invention provides a combination comprising acephate, and ortho-silicic acid.

Thus, in an embodiment, the present invention provides a combination comprising imidaloprid and ortho-silicic acid.

In an embodiment, the present invention provides a composition comprising the combination as described in any of the above embodiments, and at least one agrochemically acceptable excipient.

In an embodiment, the present invention provides a method of controlling sucking pests/mites comprising applying, to the locus to be treated, a combination or a composition as described in any of the above embodiments.

In an aspect the present invention provides use of a composition for controlling insects comprising at least one insecticide and at least one plant health promoting agent.

In another aspect the present invention provides use of said combination of at least one insecticide and at least one plant health promoting agent or composition thereof, for reducing overall damage of plants and plant parts as well as losses in harvested fruits or vegetables caused by insects, mites, nematodes and/or phytopathogens.

In another aspect, the present invention provides use of a combination at locus to be treated against insects, mites, nematodes and/or phytopathogens, comprising applying at locus to be treated a combination of at least one insecticide and at least one plant health agent.

In another aspect, the present invention provides use of a combination to promote health of the plant, comprising applying to a plant to be treated a combination of comprising at least one insecticide and at least one plant health promoting agent.

In an embodiment use of present compositions comprising contacting insects with a synergistically effective amount of a combination of comprising at least one insecticide and at least one silisic acid based plant health promoting agent.

The compositions of the present invention can be used in agricultural lands such as fields, paddy fields, lawns and orchards or in non-agricultural lands. The present invention may be used to control diseases in agricultural lands for cultivating the plants without any phytotoxicity to the plant.

Examples of the crops on which the present compositions may be used include but are not limited to corn, rice, wheat, barley, rye, oat, sorghum, cotton, soybean, peanut, buckwheat, beet, rapeseed, sunflower, sugar cane, tobacco, etc.; vegetables: okra, solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as Perilla frutescens, mint, basil, etc, strawberry, sweet potato, Dioscorea japonica, colocasia, etc., flowers, foliage plants, turf grasses, fruits: pome fruits such apple, pear, quince, etc, stone fleshy fruits such as peach, plum, nectarine, Prunus mume, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., trees other than fruit trees; tea, mulberry, flowering plant, trees such as ash, birch, dogwood, Eucalyptus, Ginkgo biloba, lilac, maple, Quercus, poplar, Judas tree, Liquidambar formosana, plane tree, zelkova, Japanese arborvitae, fir wood, hemlock, juniper, Pinus, Picea, and Taxus cuspidate, etc.

In an aspect, the present invention may provide methods of controlling fungal and/or insecticidal pests at a locus and promoting health of the plant, said method comprising applying a combination comprising:

(a) at least one insecticide and (b) silicic acid based plant health promoting additive.

In another aspect, the present invention may provide methods of controlling fungal and/or insecticidal pests at a locus and promoting health of the plant, said method comprising applying a combination comprising:

(c) at least one insecticide;

(d) at least one dithiocarbamate fungicide; and (e) silicic acid based plant health promoting additive.

In an embodiment, the insecticide, the dithiocarbamate fungicide and the silicic acid based plant health promoting additive may be selected according to any of the preferred embodiments of the combinations described hereinabove.

In an aspect, the present combinations may be used to promote health of the plant, said method comprising applying a combination of:

(a) at least one insecticide;

(b) at least one dithiocarbamate fungicide; and (c) silicic acid based plant health promoting additive.

In an embodiment, the insecticide, the dithiocarbamate fungicide and the silicic acid based plant health promoting additive may be selected according to any of the preferred embodiments of the combinations described hereinabove.

The combinations of the present invention may be sold as a pre-mix composition or a kit of parts such that individual actives may be mixed before spraying. Alternatively, the kit of parts may contain the dithiocarbamate fungicide and the second and/or third fungicide pre-mixed and the insecticide may be admixed with an adjuvant and the silicic acid based plant health additive packaged separately, such that the three components may be tank mixed before spraying.

In an embodiment the present invention provides a kit of parts comprising at least one insecticide, at least one plant health promoting agent optionally with one or more agrochemically acceptable excipients and an instruction information to apply said components at the locus to be treated against pests specifically insects.

In an embodiment the present invention provides a kit of parts further comprising comprising at least one fungicide.

The composition of the present invention maybe applied simultaneously as a tank mix or a formulation or may be applied sequentially. The application may be made to the soil before emergence of the plants, either pre-planting or post-planting. The application may be made as a foliar spray at different timings during crop development, with either one or two or three applications early or late post-emergence.

In exemplary embodiments, some preferred embodiments according to the present invention include the following preferred combinations.

In an embodiment, the present invention may also provide compositions comprising the combinations as exemplified in the table below, and at least one agrochemically acceptable excipient.

| Insecticide [A] | Silicic acid [B] | Fungicide [C] |
|---|---|---|
| Chlorfenapyr | Metasilicic acid | — |
| Chlorfenapyr | Orthosilicic acid | — |
| Chlorfenapyr | Disilicic acid | — |
| Chlorfenapyr | Pyrosilicic acid | — |
| Thiocyclam | Metasilicic acid | — |
| Thiocyclam | Orthosilicic acid | — |
| Thiocyclam | Disilicic acid | — |
| Thiocyclam | Pyrosilicic acid | — |
| Methoxyfenozide | Metasilicic acid | — |
| Methoxyfenozide | Orthosilicic acid | — |
| Methoxyfenozide | Disilicic acid | — |
| Methoxyfenozide | Pyrosilicic acid | — |
| Novaluron | Metasilicic acid | — |
| Novaluron | Orthosilicic acid | — |
| Novaluron | Disilicic acid | — |
| Novaluron | Pyrosilicic acid | — |
| Flonicamid | Metasilicic acid | — |
| Flonicamid | Orthosilicic acid | — |
| Flonicamid | Disilicic acid | — |
| Flonicamid | Pyrosilicic acid | — |
| Acetamiprid | Metasilicic acid | — |
| Acetamiprid | Orthosilicic acid | — |
| Acetamiprid | Disilicic acid | — |
| Acetamiprid | Pyrosilicic acid | — |
| Acephate | Metasilicic acid | — |
| Acephate | Orthosilicic acid | — |
| Acephate | Disilicic acid | — |
| Acephate | Pyrosilicic acid | — |

-continued

| Insecticide [A] | Silicic acid [B] | Fungicide [C] |
|---|---|---|
| Dimethoate | Metasilicic acid | — |
| Dimethoate | Orthosilicic acid | — |
| Dimethoate | Disilicic acid | — |
| Dimethoate | Pyrosilicic acid | — |
| Methamidophos | Metasilicic acid | — |
| Methamidophos | Orthosilicic acid | — |
| Methamidophos | Disilicic acid | — |
| Methamidophos | Pyrosilicic acid | — |
| Phosphamidon | Metasilicic acid | — |
| Phosphamidon | Orthosilicic acid | — |
| Phosphamidon | Disilicic acid | — |
| Phosphamidon | Pyrosilicic acid | — |
| Quinalphos | Metasilicic acid | — |
| Quinalphos | Orthosilicic acid | — |
| Quinalphos | Disilicic acid | — |
| Quinalphos | Pyrosilicic acid | — |
| Flonicamid | Metasilicic acid | Mancozeb |
| Flonicamid | Orthosilicic acid | Mancozeb |
| Flonicamid | Disilicic acid | Mancozeb |
| Flonicamid | Pyrosilicic acid | Mancozeb |
| Chlorfenapyr | Metasilicic acid | Mancozeb |
| Chlorfenapyr | Orthosilicic acid | Mancozeb |
| Chlorfenapyr | Disilicic acid | Mancozeb |
| Chlorfenapyr | Pyrosilicic acid | Mancozeb |
| Thiocyclam | Metasilicic acid | Mancozeb |
| Thiocyclam | Orthosilicic acid | Mancozeb |
| Thiocyclam | Disilicic acid | Mancozeb |
| Thiocyclam | Pyrosilicic acid | Mancozeb |
| Methoxyfenozide | Metasilicic acid | Mancozeb |
| Methoxyfenozide | Orthosilicic acid | Mancozeb |
| Methoxyfenozide | Disilicic acid | Mancozeb |
| Methoxyfenozide | Pyrosilicic acid | Mancozeb |
| Nov aluron | Metasilicic acid | Mancozeb |
| Nov aluron | Orthosilicic acid | Mancozeb |
| Nov aluron | Disilicic acid | Mancozeb |
| Nov aluron | Pyrosilicic acid | Mancozeb |
| Quinalphos | Metasilicic acid | Mancozeb |
| Quinalphos | Orthosilicic acid | Mancozeb |
| Quinalphos | Disilicic acid | Mancozeb |
| Quinalphos | Pyrosilicic acid | Mancozeb |
| Acetamiprid | Metasilicic acid | Mancozeb |
| Acetamiprid | Orthosilicic acid | Mancozeb |
| Acetamiprid | Disilicic acid | Mancozeb |
| Acetamiprid | Pyrosilicic acid | Mancozeb |
| Acephate | Metasilicic acid | Mancozeb |
| Acephate | Orthosilicic acid | Mancozeb |
| Acephate | Disilicic acid | Mancozeb |
| Acephate | Pyrosilicic acid | Mancozeb |
| Dimethoate | Metasilicic acid | Mancozeb |
| Dimethoate | Orthosilicic acid | Mancozeb |
| Dimethoate | Disilicic acid | Mancozeb |
| Dimethoate | Pyrosilicic acid | Mancozeb |
| Methamidophos | Metasilicic acid | Mancozeb |
| Methamidophos | Orthosilicic acid | Mancozeb |
| Methamidophos | Disilicic acid | Mancozeb |
| Methamidophos | Pyrosilicic acid | Mancozeb |
| Phosphamidon | Metasilicic acid | Mancozeb |
| Phosphamidon | Orthosilicic acid | Mancozeb |
| Phosphamidon | Disilicic acid | Mancozeb |
| Phosphamidon | Pyrosilicic acid | Mancozeb |
| Chlorantraniliprole | Metasilicic acid | Mancozeb |
| Chlorantraniliprole | Orthosilicic acid | Mancozeb |
| Chlorantraniliprole | Disilicic acid | Mancozeb |
| Chlorantraniliprole | Pyrosilicic acid | Mancozeb |
| Cyantraniliprole | Metasilicic acid | Mancozeb |
| Cyantraniliprole | Orthosilicic acid | Mancozeb |
| Cyantraniliprole | Disilicic acid | Mancozeb |
| Cyantraniliprole | Pyrosilicic acid | Mancozeb |
| Flubendiamide | Metasilicic acid | Mancozeb |
| Flubendiamide | Orthosilicic acid | Mancozeb |
| Flubendiamide | Disilicic acid | Mancozeb |
| Flubendiamide | Pyrosilicic acid | Mancozeb |
| Flonicamid | Metasilicic acid | Folpet |
| Flonicamid | Orthosilicic acid | Folpet |
| Flonicamid | Disilicic acid | Folpet |
| Flonicamid | Pyrosilicic acid | Folpet |
| Cyantraniliprole | Metasilicic acid | Folpet |

-continued

| Insecticide [A] | Silicic acid [B] | Fungicide [C] |
|---|---|---|
| Cyantraniliprole | Orthosilicic acid | Folpet |
| Cyantraniliprole | Disilicic acid | Folpet |
| Cyantraniliprole | Pyrosilicic acid | Folpet |
| Flubendiamide | Metasilicic acid | Folpet |
| Flubendiamide | Orthosilicic acid | Folpet |
| Flubendiamide | Disilicic acid | Folpet |
| Flubendiamide | Pyrosilicic acid | Folpet |
| Flonicamid | Metasilicic acid | Chlorothalonil |
| Flonicamid | Orthosilicic acid | Chlorothalonil |
| Flonicamid | Disilicic acid | Chlorothalonil |
| Flonicamid | Pyrosilicic acid | Chlorothalonil |
| Cyantraniliprole | Metasilicic acid | Chlorothalonil |
| Cyantraniliprole | Orthosilicic acid | Chlorothalonil |
| Cyantraniliprole | Disilicic acid | Chlorothalonil |
| Cyantraniliprole | Pyrosilicic acid | Chlorothalonil |
| Flubendiamide | Metasilicic acid | Chlorothalonil |
| Flubendiamide | Orthosilicic acid | Chlorothalonil |
| Flubendiamide | Disilicic acid | Chlorothalonil |
| Flubendiamide | Pyrosilicic acid | Chlorothalonil |
| Chlorantraniliprole | Metasilicic acid | TBCS |
| Chlorantraniliprole | Orthosilicic acid | TBCS |
| Chlorantraniliprole | Disilicic acid | TBCS |
| Chlorantraniliprole | Pyrosilicic acid | TBCS |
| Cyantraniliprole | Metasilicic acid | TBCS |
| Cyantraniliprole | Orthosilicic acid | TBCS |
| Cyantraniliprole | Disilicic acid | TBCS |
| Cyantraniliprole | Pyrosilicic acid | TBCS |
| Flubendiamide | Metasilicic acid | TBCS |
| Flubendiamide | Orthosilicic acid | TBCS |
| Flubendiamide | Disilicic acid | TBCS |
| Flubendiamide | Pyrosilicic acid | TBCS |
| Chlorantraniliprole | Metasilicic acid | Mancozeb |
| Chlorantraniliprole | Orthosilicic acid | Mancozeb |
| Chlorantraniliprole | Disilicic acid | Mancozeb |
| Chlorantraniliprole | Pyrosilicic acid | Mancozeb |

These combinations only represent the exemplary embodiments of the present invention and are in no way to be construed as limiting the scope of the invention.

In all the embodiments described herein in the above table, the fungicide [C] may be present or may be absent altogether from the combinations. However, the presence of silicic acid [B] is essential according to the present invention.

The compositions according to the invention can be applied before or after infection of the useful plants or the propagation material thereof by the fungi.

As demonstrated in the examples, the addition of a silicic acid based plant health promoting additive to a combination of insecticidal compound (s), greatly improved the disease control as well as improved yield and demonstrated a synergistic effect.

The lower the mixture performance in the disease control, the greater the additional benefit of the silicic acid based plant health promoting additive when added to the compositions of the present invention.

The rates of application of insecticide may vary, according to type of crop, the specific active ingredient, the number of active ingredients, type of plant propagation material but is such that the active ingredient(s) is in an effective amount to provide the desired action (such as disease or pest control) and can be determined by trials.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Example 1

Trials were conducted to test the efficacy of the combination of Flonicamid and Orthosilicic acid on controlling Okra Aphids at different dosages. Table 1 below summarises the result of the trials.

TABLE 1

| Sr. No. | Treatments | Dose (gm/ha) | Percent control B01 | C-01 | C-10 | Mean |
|---|---|---|---|---|---|---|
| | Untreated | — | [167.9] | [318.1] | [171.9] | — |
| 1 | OSA + Flonicamid | 625 + 50 | 96.7 | 98.1 | 99.5 | 98.1 |
| 2 | Flonicamid | 75 | 88.8 | 91.8 | 96 | 92.2 |
| 3 | OSA | 1250 | 29.6 | 23.3 | 26.7 | 26.53 |

Conclusion

The combination of Flonicamid+OSA showed synergy against control of Okra Aphids than solo application of Flonicamid.

Example 2

Trials were conducted to test the efficacy of the combination of Flonicamid and Orthosilicic acid on controlling Okra Mites at different dosages post $2^{nd}$ and $3^{rd}$ application. Table 2 below summarises the result of the trials.

TABLE 2

| Sr. No. | Treatments | Dose (gm/ha) | Percent control B07 | C-01 | C-10 | Mean |
|---|---|---|---|---|---|---|
| | Untreated | — | [131.1] | [151.2] | [302.9] | — |
| 1 | OSA + Flonicamid | 625 + 50 | 55.5 | 62.0 | 52.6 | 56.7 |
| 2 | OSA + Acetamipirid | 625 + 50 | 44.8 | 46.4 | 37.7 | 42.96 |
| 3 | OSA + Lancer Gold | 625 + 650 | 35.9 | 42.0 | 38.1 | 38.66 |

TABLE 2-continued

| Sr. | | Dose | Percent control | | | |
|---|---|---|---|---|---|---|
| No. | Treatments | (gm/ha) | B07 | C-01 | C-10 | Mean |
| 4 | OSA | 1250 | 10 | 19.3 | 11.7 | 13.66 |
| 5 | Flonicamid | 75 | 31.8 | 39.5 | 34.0 | 35.1 |
| 6 | Acetamipirid | 50 | 24.6 | 26.9 | 22.2 | 24.56 |
| 7 | Lancer gold | 650 | 14.4 | 19.6 | 20.4 | 18.13 |

Conclusion

From the above data it is concluded that the combination of an insecticide with OSA showed synergy against control of mites than solo application of insecticide.

Example 3

The following field trials were carried out for further evaluation of the synergistic insecticidal effect of a combination of insecticide plus plant growth promoting agent (OSA) against Corn Fall armyworm (FAW) (*Spodoptera frugiperda*).

Application method: Two applications (application A and B) within an interval of 14 days. A01=1 day after first spray, A14=14 days after 1st spray, B03=3 days after 2nd spray.

TABLE 3

| Sr. | | Dose Active | Target insect: Corn FAW (Spodoptera frugiperda) Post 1st & 2nd application Percent control (%) | | | | | |
|---|---|---|---|---|---|---|---|---|
| No. | Treatments | (gm a.i./ha) | A01 | A14 | B03 | B07 | B10 | B21 |
| T-1 | Untreated Check | | [1.4] | [2.5] | [3.0] | [3.3] | [3.6] | [4.6] |
| T-2 | OSA + CTPR | 25 + 30 | 71.7 | 80.3 | 89.8 | 93.7 | 95.3 | 93.4 |
| T-3 | OSA + Acephate | 25 + 970 | 63.0 | 73.8 | 78.7 | 83.4 | 87.7 | 86.0 |
| T-4 | OSA + Novaluron | 25 + 75 | 69.5 | 78.9 | 83.2 | 91.7 | 91.5 | 88.5 |
| T-5 | OSA + Novaluron + Lambda cyhaothrin | 25 + 90 | 72.2 | 82.8 | 86.5 | 93.8 | 94.5 | 91.3 |
| T-6 | OSA + Novaluron + Emamectin | 25 + 125 | 76.8 | 86.9 | 93.1 | 96.9 | 96.4 | 94.2 |
| T-7 | OSA | 25 | 32.4 | 47.4 | 53.7 | 58.6 | 60.6 | 59.0 |
| T-8 | CTPR | 30 | 67.6 | 75.2 | 79.9 | 86.8 | 88.9 | 87.0 |
| T-9 | Acephate | 970 | 58.1 | 69.7 | 76.4 | 80.5 | 83.2 | 80.3 |
| T-10 | Novaluron | 75 | 60.5 | 72.5 | 79.9 | 88.8 | 88.9 | 84.7 |
| T-11 | Novaluron + Lambda cyhalothrin | 90 | 67.6 | 76.4 | 84.2 | 89.5 | 90.7 | 89.0 |
| T-12 | Novaluron + Emamectin | 125 | 72.2 | 81.7 | 90.0 | 94.8 | 93.4 | 91.2 |
| | 'LSD P = .05 | | 14.4 | 4.65 | 5.92 | 5.25 | 6.27 | 5.16 |

The above treatments were repeated with 25% reduced dose of insecticide compound. The results are represented in table below.

TABLE 4

| Sr. | | Dose Active | Target insect: Corn FAW (Spodoptera frugiperda) Post 1st & 2nd application Percent control (%) | | | | | |
|---|---|---|---|---|---|---|---|---|
| No. | Treatments | (gm a.i./ha) | A01 | A14 | B03 | B07 | B10 | B21 |
| T-1 | Untreated Check | — | [1.6] | [2.9] | [3.3] | [3.8] | [4.2] | [4.6] |
| T-2 | OSA + CTPR | 25 + 22.5 | 65.8 | 79.3 | 89 | 92.9 | 95.2 | 93.5 |
| T-3 | OSA + Acephate | 25 + 730 | 56.9 | 62 | 70.9 | 75.5 | 76.2 | 75.4 |
| T-4 | OSA + Novaluron | 25 + 56 | 61.6 | 73.6 | 81 | 84.2 | 85.7 | 87.0 |

TABLE 4-continued

| Sr. No. | Treatments | Dose Active (gm a.i./ha) | Target insect: Corn FAW (Spodoptera frugiperda) Post 1st & 2nd application Percent control (%) A01 | A14 | B03 | B07 | B10 | B21 |
|---|---|---|---|---|---|---|---|---|
| T-5 | OSA + Novaluron + Lambda cyhalothrin | 25 + 67.5 | 72.4 | 75.9 | 86 | 87.7 | 90.5 | 90.5 |
| T-6 | OSA + Novaluron + Emamectin | 25 + 93.5 | 70.2 | 77 | 88 | 92.1 | 95.3 | 94.2 |
| T-7 | OSA | 25 | 29.3 | 44.8 | 51.9 | 61.4 | 57.9 | 56.5 |
| T-8 | CTPR | 22.5 | 57.1 | 66.8 | 75 | 77.2 | 76.2 | 74.6 |
| T-9 | Acephate | 730 | 46.8 | 50.3 | 62.1 | 63.9 | 64.1 | 61.6 |
| T-10 | Novaluron | 56 | 59.3 | 58.7 | 68.9 | 70.1 | 74.6 | 73.9 |
| T-11 | Novaluron + Lambda cyhalothrin | 67.5 | 54.9 | 62 | 67 | 73.6 | 76.1 | 75.3 |
| T-12 | Novaluron + Emamectin | 93.5 | 57.1 | 65.6 | 72.9 | 76.3 | 81 | 79.7 |
| | 'LSD P = .05 | | 13.56 | 14.23 | 8.31 | 7.13 | 7.18 | 4.52 |

Conclusion

The combination of OSA with CTPR, Novaluron+Emamectin, Novaluron+Lambda cyhalothrin & Novaluron provided excellent control of Fall armyworm in corn. When insecticide is mixed GSA showed synergy and increased efficacy against the target insect. Further reduced amount of insecticide in combination with GSA also provided excellent control of Fall armyworm in corn.

Example 4

The following field trials demonstrate the synergistic insecticidal effect of a combination of insecticide plus plant growth promoting agent (GSA) against sucking pests of okra particularly Aphid and Jassid.

In this evaluation, feeding damage & insect population on Okra Leaves before and after sprays is averaged and analyzed for the test of significance. Application method: Three applications (application A, B and C) within an interval of 14 days.

The results are represented in below tables.

TABLE 5

| Sr. No. | Treatments | Dose Active (gm a.i./ha) | Percent control (%) of Okra Aphids (Aphis gossypii)- Post 1st, 2nd and 3rd application Nymphs + Adults A01 | A10 | B03 | B07 | B10 | C03 | C10 |
|---|---|---|---|---|---|---|---|---|---|
| T-1 | Untreated Check | — | [46.8] | [116.4] | [239.6] | [268.7] | [285.4] | [294.6] | [231.7] |
| T-2 | OSA + Flonicamid | 25 + 100 | 80.2 | 98.7 | 99.4 | 100 | 100 | 100 | 100 |
| T-3 | OSA + Acephate + Imidacloprid | 25 + 520 | 67.4 | 81.9 | 83.3 | 85.9 | 85.7 | 85.9 | 86.5 |
| T-4 | OSA + Flonicamid + Fipronil | 25 + 100 + 50 | 82.2 | 100 | 100 | 100 | 100 | 100 | 100 |
| T-5 | OSA + Imidacloprid | 25 + 24.5 | 67.5 | 85.7 | 86.2 | 88.7 | 87 | 86.7 | 88.6 |
| T-6 | OSA + Acetamiprid | 25 + 15 | 74.1 | 88.7 | 89.8 | 90.3 | 90.1 | 90.2 | 91.5 |
| T-7 | OSA | 25 | 32.3 | 48.5 | 52 | 56 | 56.1 | 57 | 59.7 |
| T-8 | Flonicamid | 100 | 78.2 | 91.9 | 95.1 | 95.5 | 93 | 94.7 | 94.9 |
| T-9 | Acephate + Imidacloprid | 520 | 66.9 | 76.5 | 74.7 | 78.4 | 77.6 | 76.5 | 77.2 |
| T-10 | Flonicamid + Fipronil | 100 + 50 | 82.4 | 96.3 | 97.9 | 97.2 | 94.5 | 97.2 | 95 |
| T-11 | Imidacloprid | 24.5 | 66.9 | 82 | 80.7 | 82.7 | 82.2 | 81.3 | 82.6 |
| T-12 | Acetamiprid | 15 | 71.1 | 86.1 | 86.8 | 86.7 | 85 | 87.4 | 87.6 |
| | 'LSD P = .05 | | 5.17 | 5.17 | 1.18 | 1.06 | 0.9 | 0.9 | 1.07 |

A01 = 1 day after first spray, A14 = 14days after 1st spray, B03 = 3days after 2nd spray and C03 = 3 days after third spray.

TABLE 5A

| Sr. No. | Treatments | Dose Active (gm a.i./ha) | Percent control (%) of Okra Aphids (Aphis gossypii)- Post 1st, 2nd and 3rd application Nymphs + Adults A01 | A14 | B03 | B07 | B10 | C03 | C10 |
|---|---|---|---|---|---|---|---|---|---|
| T-1 | Untreated Check | | [43.2] | [201.5] | [251.4] | [282.7] | [301.5] | [292.6] | [246.5] |
| T-2 | OSA + Flonicamid | 25 + 75 | 74.5 | 88.8 | 97.5 | 100 | 100 | 100 | 100 |
| T-3 | OSA + Acephate + Imidacloprid | 25 + 390 | 65.3 | 76.4 | 81.5 | 84.1 | 85.9 | 85 | 85.3 |
| T-4 | OSA + Flonicamid + Fipronil | 25 + 75+ 37.5 | 75.2 | 91.7 | 99.4 | 100 | 100 | 100 | 100 |
| T-5 | OSA + Imidacloprid | 25 + 18.3 | 64.2 | 76.6 | 83.4 | 87.6 | 87.6 | 83.6 | 89.1 |
| T-6 | OSA + Acetamiprid | 25 + 11.2 | 69.3 | 81 | 85.4 | 89.4 | 90.8 | 87.6 | 90 |
| T-7 | OSA | 25 | 30.2 | 47 | 55 | 57.7 | 55.7 | 59.4 | 60.3 |
| T-8 | Ulala | 75 | 71.8 | 76.1 | 90.4 | 91.4 | 91.1 | 91.4 | 92.4 |
| T-9 | Acephate + Imidacloprid | 390 | 61.9 | 63.4 | 69.4 | 73.6 | 73.4 | 75.1 | 75.1 |
| T-10 | Flonicamid + Fipronil | 75 + 37.5 | 73.2 | 79.3 | 90.4 | 92.3 | 93.1 | 90.7 | 93 |
| T-11 | Imidacloprid | 18.3 | 62.7 | 64.3 | 74.4 | 77.2 | 79.1 | 75.4 | 78 |
| T-12 | Acetamiprid | 11.2 | 64.8 | 74.7 | 79.7 | 81.8 | 82.5 | 86.9 | 86.5 |
| | 'LSD P = .05 | | 3.22 | 0.89 | 0.35 | 0.35 | 0.66 | 0.59 | 0.68 |

TABLE 6

| Sr. No. | Treatments | Dose Rate Active (gm a.i./ha) | Percent control (%) of Okra Jassids (Amrasca bigutulla bigutulla) Post 1st, 2nd and 3rd application Nymphs + Adults A01 | A10 | B03 | B07 | B10 | B14 | C03 | C10 |
|---|---|---|---|---|---|---|---|---|---|---|
| T-1 | Untreated Check | — | [8.2] | [20.1] | [36.9] | [48.5] | [60.5] | [73.1] | [68.7] | [38.3] |
| T-2 | OSA + Flonicamid | 25 + 100 | 75.1 | 89.0 | 95.3 | 97.4 | 96.9 | 91.4 | 97.7 | 98.4 |
| T-3 | OSA + Acephate + Imida | 25 + 520 | 54.8 | 66.6 | 67.6 | 71.7 | 72.7 | 65.8 | 66.7 | 76 |
| T-4 | OSA + Flonicamid + Fipronil | 25 + 100 + 50 | 81.1 | 92.8 | 98.4 | 100 | 100 | 94 | 100 | 100 |
| T-5 | OSA + Imidacloprid | 25 + 24.5 | 67.8 | 72.1 | 74.1 | 75.8 | 76.4 | 72.5 | 75.2 | 77.5 |
| T-6 | OSA + Acetamiprid | 25 + 15 | 72.1 | 78.3 | 78.3 | 79.7 | 82.7 | 76.6 | 80.6 | 84.3 |
| T-7 | OSA | 25 | 25.3 | 35.8 | 42.7 | 46.5 | 45.5 | 44.7 | 46.9 | 48.6 |
| T-8 | Flonicamid | 100 | 74.8 | 89.3 | 90.7 | 93.3 | 94.2 | 89.3 | 93.3 | 94.4 |
| T-9 | Acephate + Imidacloprid | 520 | 50.7 | 63.7 | 66.5 | 67.2 | 65.9 | 58.2 | 61.6 | 70.3 |
| T-10 | Flonicamid + Fipronil | 100 + 50 | 75.5 | 89 | 93 | 96.8 | 95.8 | 89.1 | 94.9 | 96.3 |
| T-11 | Imidacloprid | 24.5 | 59.9 | 64.6 | 68.5 | 71.7 | 70.5 | 66.2 | 68.0 | 73.0 |
| T-12 | Acetamiprid | 15 | 66.4 | 72.4 | 73.9 | 76.7 | 76.9 | 70.9 | 74.8 | 79.3 |
| | 'LSD P = .05 | | 8.16 | 3.93 | 2.29 | 2.6 | 0.94 | 1.46 | 1.93 | 1.7 |

TABLE 6A

| Sr. No. | Treatments | Dose Active (gm a.i./ha) | Percent control (%) of Okra Jassids (Amrasca bigutulla bigutulla) Post 1st, 2nd and 3rd application Nymphs + Adults | | | | | | | |
|---|---|---|---|---|---|---|---|---|---|---|
| | | | A01 | A10 | B03 | B07 | B10 | B14 | C03 | C10 |
| T-1 | Untreated Check | | [7.9] | [18.7] | [32.9] | [42.3] | [55.6] | [66.2] | [61.1] | [42.1] |
| T-2 | OSA + Flonicamid | 25 + 75 | 74.6 | 87.6 | 89.3 | 94.2 | 95.1 | 89.4 | 95.6 | 97.8 |
| T-3 | OSA + Acephate + Imida | 25 + 390 | 54.3 | 64.1 | 63.8 | 66 | 66.8 | 62 | 66.2 | 69.6 |
| T-4 | OSA + Flonicamid + Fipronil | 25 + 75 + 37.5 | 78 | 91.4 | 92.1 | 96.1 | 96.8 | 92.4 | 96.1 | 98.4 |
| T-5 | OSA + Imidacloprid | 25 + 18.3 | 66.9 | 69 | 68.4 | 69.9 | 73.7 | 71.7 | 73.6 | 76.7 |
| T-6 | OSA + Acetamiprid | 25 + 11.2 | 72 | 75.8 | 73.7 | 75.4 | 80.2 | 73.2 | 77.3 | 80.8 |
| T-7 | OSA | 25 | 27.9 | 37 | 40.9 | 47.9 | 48.6 | 43 | 45.5 | 49.1 |
| T-8 | Flonicamid | 75 | 71.2 | 85.8 | 82 | 89.3 | 91.5 | 87.4 | 90.2 | 92.5 |
| T-9 | Acephate + Imidacloprid | 390 | 47.5 | 61.2 | 62.6 | 61 | 62.8 | 57.1 | 63.8 | 66.2 |
| T-10 | Flonicamid + Fipronil | 75 + 37.5 | 72.9 | 87.5 | 86.2 | 90.1 | 92 | 85.9 | 91.4 | 93.5 |
| T-11 | Imidacloprid | 18.3 | 56 | 59.1 | 61.5 | 62.5 | 63.5 | 62.4 | 64.6 | 66.1 |
| T-12 | Acetamiprid | 11.2 | 59.3 | 64.4 | 68.8 | 70.9 | 71.3 | 66.6 | 69.5 | 70.7 |
| | LSD P = .05 | | 5.14 | 2.48 | 1.81 | 1.5 | 1.26 | 2.26 | 2.13 | 1.08 |

Conclusion

Okra Aphids

The combination of insecticide and plant growth promoting agent provided excellent control of Aphids as demonstrated in table 5 and table 5A. Good okra fruit yield was recorded in all combination treatments. Further it was observed that the tank mix combination in treatments T-2 & T-4 with plant growth promoting agent (OSA) provided 7 to 10% more control of Aphids than without OSA treatments ((T-8 & T-10)). Surprisingly, the treatments with reduced amount of active insecticide applied plus plant growth promoting agent (OSA) provided excellent control on insects.

Okra Jassids

The combination of insecticide and plant growth promoting agent provided excellent control of Jassids as demonstrated in table 6 and table 6A. The combination of OSA+Flonicamid+Fipronil in treatment T-4 gave excellent control of Jassids. The tank mix combination in treatment T-2 & T-4 with OSA gives 5 to 7% more control of Jassids than without OSA treatments (T-8 & T-10) under 25% reduced dose rate of Flonicamid & Flonicamid+Fipronil.

The instant invention is more specifically explained by above examples. However, it should be understood that the scope of the invention is not limited by the examples in any manner. It will be appreciated by any person skilled in this art that the present invention includes aforesaid examples and further can be modified and altered within the technical scope of the present invention.

I claim:

1. A combination, consisting of:

an insecticide and a silicic acid based plant health promoting agent, wherein the silicic acid based plant health promoting agent is selected from the group consisting of: metasilicic acid ($H_2SiO_3$), orthosilicic acid ($H_4SiO_4$), disilicic acid ($H_2Si_2O_5$), and pyrosilicic acid ($H_6Si_2O_7$), wherein said insecticide is selected from the group consisting of: flonicamid, acetamiprid, acephate, novaluron, a combination of novaluron and lambda cyhalothrin, emamectin, imidacloprid, and a combination of flonicamid and fipronil.

2. A method of treating a plant, comprising applying to the plant to be treated, a part of a plant, a plant organ, and/or a plant propagation material thereof, the combination of claim 1, wherein the combination further includes at least one fungicide, and wherein the combination controls undesirable pests selected from the classes insecta, arachnida, and nematoda.

3. A method of controlling insects or preventing damage to a plant, comprising applying to the plant, a part of the plant, a plant organ, and/or a plant propagation material thereof, a synergistically effective amount of the combination of claim 1, wherein the combination further includes at least one fungicide.

4. A method of controlling fungus and/or pests at a locus, comprising applying to the locus the combination according to claim 1, wherein the combination further includes at least one fungicide.

5. A combination consisting of:

an insecticide;

a silicic acid based plant health promoting agent; and an additional fungicide;

wherein the silicic acid based plant health promoting agent is selected from the group consisting of metasilicic acid ($H_2SiO_3$), orthosilicic acid ($H_4SiO_4$), disilicic acid ($H_2Si_2O_5$), and pyrosilicic acid ($H_6Si_2O_7$), and wherein said insecticide is selected from the group consisting of: flonicamid, acetamiprid, acephate, novaluron, a combination of novaluron and lambda cyhalothrin, emamectin, imidacloprid, and a combination of flonicamid and fipronil.

6. A combination, consisting of:

an insecticide;

a silicic acid based plant health promoting agent;

a stabilization agent; and, an agricultural excipient;

wherein the silicic acid-based plant health promoting agent is selected from the group consisting of: metasilicic acid ($H_2SiO_3$), orthosilicic acid ($H_4SiO_4$), stabilized orthosilicic acid, disilicic acid ($H_2Si_2O_5$), and pyrosilicic acid ($H_6Si_2O_7$), wherein said insecticide is selected from the group consisting of: flonicamid, acetamiprid, acephate, novaluron, a combination of novaluron and lambda cyhalothrin, emamectin, imidacloprid, and a combination of flonicamid and fipronil.

7. The combination of claim 6 wherein the stabilization agent is phosphate isopropyl (PAP) or butylated hydroxytoluene (BHT).

* * * * *